United States Patent
Hayashi et al.

(10) Patent No.: US 6,287,668 B1
(45) Date of Patent: Sep. 11, 2001

(54) MAGNETIC RECORDING MEDIUM AND SUBSTRATE THEREFOR

(75) Inventors: Kazuyuki Hayashi; Keisuke Iwasaki, both of Hiroshima; Yasuyuki Tanaka, Onoda; Hiroko Morii, Hiroshima, all of (JP)

(73) Assignee: Toda Kogyo Corporation, Tokyo (JP)

( * ) Notice: Subject to any disclaimer, the term of this patent is extended or adjusted under 35 U.S.C. 154(b) by 0 days.

(21) Appl. No.: 09/523,646

(22) Filed: Mar. 10, 2000

Related U.S. Application Data

(63) Continuation-in-part of application No. 09/208,771, filed on Dec. 10, 1998, now abandoned.

(30) Foreign Application Priority Data

Dec. 12, 1997 (JP) .................................... 9-362701

(51) Int. Cl.$^7$ .................................... G11B 5/733
(52) U.S. Cl. .................... 428/141; 428/329; 428/403; 428/404; 428/405; 428/694 BS; 428/900
(58) Field of Search .................... 428/141, 329, 428/403, 404, 405, 694 BS, 900

(56) References Cited

U.S. PATENT DOCUMENTS 5,324,571   6/1994   Koyama et al. .................. 428/212
5,639,075   6/1997   Tyree .................................. 267/281

FOREIGN PATENT DOCUMENTS

0582472A1   2/1994   (EP) .
0660309A1   6/1995   (EP) .
0769775A1   4/1997   (EP) .

Primary Examiner—Stevan A. Resan
(74) Attorney, Agent, or Firm—Nixon & Vanderhye

(57) ABSTRACT

A magnetic recording medium of the present invention comprises:

a non-magnetic base film;

a non-magnetic undercoat layer formed on said non-magnetic base film, comprising a binder resin and non-magnetic acicular black iron-based composite particles; and a magnetic coating film comprising a binder resin and magnetic particles, said non-magnetic acicular black iron-based composite particles comprising: acicular hematite particles or acicular iron oxide hydroxide particles having an average major axis diameter of 0.02 to 0.30 $\mu$m; a coating layer formed on the surface of said acicular hematite particle or acicular iron oxide hydroxide particle, comprising a specific organosilicon compound; and a carbon black coat formed on said coating layer.

Such a magnetic recording medium has a more smooth surface, a high strength and a lower light transmittance and a low electric resistance even at a small carbon black content.

34 Claims, 2 Drawing Sheets

(x60000)

(x60000)

(x60000)

(x60000)

MAGNETIC RECORDING MEDIUM AND SUBSTRATE THEREFOR

CROSS REFERENCE TO RELATED APPLICATION

This application is a continuation-in-part of application Ser. No. 09/208,771, filed Dec. 10, 1999 now abandoned, the entire content of which is hereby incorporated by reference in this application.

BACKGROUND OF THE INVENTION

The present invention relates to a magnetic recording medium and a substrate therefor, and more particularly, to a magnetic recording medium comprising a non-magnetic undercoat layer having a smooth surface, a high strength and a lower light transmittance and a low electric resistance even at a small carbon black content, and a substrate for the magnetic recording medium.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

A reduction in the thickness of a magnetic recording layer is described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness, . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic coating film depends on the surface roughness of the base film (back surface roughness) so largely as to be approximately proportional, . . . , since the magnetic coating film is formed on the base film, the more smooth the surface of the base film is, the more uniform and larger head output is obtained and the more the S/N ratio is improved."

Secondly, there has been caused a problem in the strength of a base film with a tendency of the reduction in the thickness of the base film in response to the demand for a thinner magnetic coating film. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded, . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black fine particles or the like is added to the magnetic recording layer. It is, therefore, essential to add carbon black or the like to a magnetic recording layer in the present video tapes.

However, addition of a large amount of non-magnetic particles such as carbon black fine particles impairs not only the enhancement of the magnetic recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black fine particles which are added to a magnetic recording layer.

Consequently, it has been strongly demanded to provide a magnetic recording medium capable of exhibiting a low light transmittance even when the amount of carbon black fine particles added to a magnetic recording layer thereof is reduced as low as possible. From this viewpoint, it has been strongly required to essentially improve properties of a substrate therefor.

Further, in order to reduce not only the above-mentioned light transmittance of the magnetic recording medium but also an electric resistance thereof, there has been hitherto proposed a method of adding carbon black fine particles to the magnetic recording layer.

The conventional magnetic recording medium to which carbon black fine particles are added, is described in detail below.

When a magnetic recording medium has a high surface resistivity, an electrostatic charge thereon tends to be increased, so that cut chips of the magnetic recording medium and dirt or dusts are attached onto the surface of the magnetic recording medium upon production or use thereof, and as a result, such a problem that the number of "drop-out" becomes increased, is caused.

In order to decrease the surface resistivity of the magnetic recording medium to about $10^8$ Ω/sq, a conductive compound such as carbon black fine particles has been ordinarily added to the magnetic recording layer in an amount of not less than about 5 parts by weight based on 100 parts of magnetic particles contained in the magnetic recording layer.

However, when the amount of carbon black fine particles added or the like which cannot contribute to improvement in magnetic properties of the magnetic recording layer, is increased, the magnetic recording medium has been deteriorated in signal recording property as described above, resulting in inhibiting the magnetic recording layer from being thinned.

With the reduction in thickness of the magnetic recording layer or the base film therefor, various attempts have been conducted in order to improve properties of a substrate on which the magnetic recording layer is formed, thereby enhancing a surface smoothness and a strength of the magnetic recording medium. In this regard, there has been proposed a method of forming on a base film, at least one undercoat layer composed of a binder resin and non-magnetic particles dispersed in the binder resin and containing iron as a main component, such as acicular hematite particles or acicular iron oxide hydroxide particles (hereinafter referred to merely as "non-magnetic undercoat layer"), and such a method has been already put into practice (Japanese Patent Publication (KOKOKU) No. 6-93297 (1994), Japanese Patent Application Laid-open (KOKAI) Nos. 62-159338(1987), 63-187418(1988), 4-167225(1992), 4-325915(1992), 5-73882(1993), 5-182177(1993), 5-347017(1993) and 6-60362(1994), and the like).

It is known to use as the non-magnetic particles for non-magnetic undercoat layer, non-magnetic particles which surfaces are coated with hydroxides of aluminum, oxides of aluminum, hydroxides of silicon, oxides of silicon or a mixture thereof in order to improve the dispersibility thereof in vehicles, thereby enhancing a surface smoothness and a strength of the obtained non-magnetic substrate (Japanese Patent Nos. 2,571,350 and 2,582,051, and Japanese Patent Application Laid-open (KOKAI) Nos. 6-60362(1994), 9-22524(1997) and 9-27117(1997) or the like).

Also, it is known that in order to decrease an amount of carbon black fine particles added to the magnetic recording layer and reduce a light transmittance of the magnetic recording medium, blackish brown acicular hematite particles or blackish brown acicular ferric oxide hydroxide particles are used as the non-magnetic particles for non-magnetic undercoat layer (Japanese Patent Application Laid-open (KOKAI) Nos. 7-66020(1995) and 8-259237 (1996)).

Further, it is known that in order to reduce an electric resistance of the magnetic recording medium, a mixture of non-magnetic iron oxide particles and carbon black fine particles is used as the non-magnetic particles for non-magnetic undercoat layer (Japanese Patent Application Laid-open (KOKAI) Nos. 1-213822(1989), 1-300419 (1989), 6-236542(1994) and 9-297911(1997) or the like).

With the reduction in thickness of not only the magnetic recording layer but also the base film, it has been most demanded to provide such a magnetic recording medium having a more smooth surface, a high strength, and a lower light transmittance and a lower electric resistance even when the amount of carbon black fine particles in the magnetic recording layer is reduced as low as possible. However, at present, magnetic recording media capable of satisfying all of such requirements have not been obtained yet.

Namely, in the case of the above-mentioned conventional substrates produced by using as the non-magnetic particles for non-magnetic undercoat layer, acicular hematite particles, acicular iron oxide hydroxide particles, acicular hematite particles coated with hydroxides of aluminum or the like, or acicular iron oxide hydroxide particles coated with hydroxides of aluminum or the like, although surface smoothness and high strength of the substrate using these particles as non-magnetic particles are satisfied, it is difficult to reduce the light transmittance due to dark red or yellowish brown color of the non-magnetic particles. In addition, the non-magnetic substrate exhibit a surface resistivity as large as not less than about $10^{13}$ Ω/sq.

Further, in the case of the above-mentioned substrate using as non-magnetic particles for non-magnetic undercoat layer, blackish brown acicular hematite particles or blackish brown acicular iron oxide hydroxide particles, the obtained non-magnetic undercoat layer can show a higher degree of blackness as compared to those using the dark red acicular hematite particles or the yellowish brown acicular iron oxide hydroxide particles, so that it becomes possible to reduce a light transmittance of the substrate. However, the reduction of light transmittance is still insufficient. In addition, the surface resistivity of the non-magnetic substrate is as large as about $10^{12}$ Ω/sq.

In the case of the non-magnetic particles described in the above-mentioned Japanese Patent Application Laid-open (KOKAI) Nos. 1-213822(1989), 1-300419(1989) and 9-297911(1997), there have been used the mixture of non-magnetic iron oxide particles and carbon black particles in which the carbon black particles are added in an amount of not less than 25 parts by weight based on 100 parts by weight of the non-magnetic iron oxide particles. Therefore, due to the fact that the carbon black particles which show the largest degree of blackness among various black pigments, are used in such a large amount, it is possible to obtain a non-magnetic substrate having a low light transmittance and a low electric resistance. However, it has been difficult to disperse the carbon black fine particles in vehicles, since the carbon black fine particles are fine particles having such a small average diameter as about 0.002 to about 0.05 μm, a large specific surface area and a deteriorated solvent wettability, thereby failing to obtain a non-magnetic substrate having a smooth surface and a high strength. In addition, the carbon black fine particles have a bulk density as low as about 0.1 g/cm³ and, therefore, the carbon black fine particles are bulky particles, resulting in deteriorated handing property and workability. Further, with respect to the carbon black fine particles, many problems concerning safety or hygiene such as carcinogenesis have been pointed out.

Thus, as the amount of the carbon black fine particles added to the non-magnetic substrate is increased, the light transmittance of the obtained non-magnetic substrate tends to become small. However, when the carbon black fine particles are used in a large amount, it becomes more difficult to disperse the particles in vehicles, resulting in deteriorated workability. Further, the use of a large amount of the carbon black fine particles are disadvantageous in view of safety and hygiene.

In the above-mentioned Japanese Patent Application Laid-open (KOKAI) No. 6-236542(1994), there have been described such non-magnetic particles mixture of non-magnetic iron oxide particles and carbon black fine particles having a specific structure in which the carbon black fine particles are used in an amount of 1 to 17.6 parts by weight based on 100 parts by weight of the non-magnetic iron oxide particles. By using such specific carbon black fine particles having a high conductivity, the electric resistance of the obtained non-magnetic substrate can be reduced even at a small carbon black fine particles content. However, since the amount of carbon black fine particles used is small, it is difficult to reduce a light transmittance of the non-magnetic substrate.

In consequence, it has been strongly demanded to provide a magnetic recording medium and a non-magnetic substrate therefor which can exhibit a smooth surface, a high strength, and a lower light transmittance and a lower electric resistance even at a small carbon black content.

As a result of the present inventors' earnest studies, it has been found that by using as non-magnetic particles contained in a non-magnetic undercoat layer, non-magnetic acicular black iron-based composite particles comprising:

acicular hematite particles or acicular iron oxide hydroxide particles having an average major axis diameter of 0.02 to 0.30 µm;

a coating layer formed on the surface of the said acicular hematite particle or acicular iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising said organosilicon compound, in an amount of 1 to 20 parts by weight based on 100 parts by weight of the said acicular hematite particles or acicular iron oxide hydroxide particles, the obtained non-magnetic substrate can exhibit a more excellent smooth surface, a high strength, and a lower light transmittance and a lower electric resistance even at a small carbon black content. The present invention has been attained on the basis of this finding.

SUMMARY OF THE INVENTION

It is an object of the present invention to provide a non-magnetic substrate for a magnetic recording medium which can show a more smooth surface, a high strength, and a lower light transmittance and a lower electric resistance even at a small carbon black content.

It is another object of the present invention to provide a magnetic recording medium having a non-magnetic undercoat layer which can show a more smooth surface, a high strength, and a lower light transmittance and a lower electric resistance even at a small carbon black content.

To accomplish the aims, in a first aspect of the present invention, there is provided a magnetic recording medium comprising:

a non-magnetic base film;

a non-magnetic undercoat layer formed on the said non-magnetic base film, comprising a binder resin and non-magnetic acicular black iron-based composite particles; and a magnetic coating film comprising a binder resin and magnetic particles, the said non-magnetic acicular black iron-based composite particles comprising:

acicular hematite particles or acicular iron oxide hydroxide particles having an average major axis diameter of 0.02 to 0.30 µm;

a coating layer formed on the surface of the said acicular hematite particle or acicular iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising the said organosilicon compound, in an amount of 1 to 20 parts by weight based on 100 parts by weight of the said acicular hematite particles or acicular iron oxide hydroxide particles.

In a second aspect of the present invention, there is provided a magnetic recording medium comprising:

a non-magnetic base film;

a non-magnetic undercoat layer formed on the said non-magnetic base film, comprising a binder resin and non-magnetic acicular black iron-based composite particles; and a magnetic coating film comprising a binder resin and magnetic particles, the said non-magnetic acicular black iron-based composite particles comprising:

acicular hematite particles or acicular iron oxide hydroxide particles having an average major axis diameter of 0.02 to 0.30 µm;

a coat formed on at least a part of the surface of the said acicular hematite particles or acicular iron oxide hydroxide particles, comprising at least one compound selected from the group consisting of hydroxides of aluminum, oxides of aluminum, hydroxides of silicon and oxides of silicon;

a coating layer formed on the said coat formed on the surface of the said acicular hematite particle or acicular iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising the said organosilicon compound, in an amount of 1 to 20 parts by weight based on 100 parts by weight of the said acicular hematite particles or acicular iron oxide hydroxide particles.

In a third aspect of the present invention, there is provided a magnetic recording medium comprising:

a non-magnetic base film;

a non-magnetic undercoat layer formed on the said non-magnetic base film, comprising a binder resin and non-magnetic acicular black iron-based composite particles; and a magnetic coating film comprising a binder resin and magnetic particles, the said non-magnetic acicular black iron-based composite particles comprising:

acicular manganese-containing hematite particles or acicular manganese-containing iron oxide hydroxide particles having an average major axis diameter of 0.02 to 0.30 µm;

a coating layer formed on the surface of the said acicular manganese-containing hematite particle or acicular manganese-containing iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising the said organosilicon compound, in an amount of 1 to 20 parts by weight based on 100 parts by weight of the said acicular hematite particles or acicular iron oxide hydroxide particles.

In a fourth aspect of the present invention, there is provided a magnetic recording medium comprising:
a non-magnetic base film;
a non-magnetic undercoat layer formed on the said non-magnetic base film, comprising a binder resin and non-magnetic acicular black iron-based composite particles; and
a magnetic coating film comprising a binder resin and magnetic particles,
said non-magnetic acicular black iron-based composite particles comprising:
acicular manganese-containing hematite particles or acicular manganese-containing iron oxide hydroxide particles having an average major axis diameter of 0.02 to 0.30 µm;
a coat formed on at least a part of the surface of the said acicular manganese-containing hematite particles or acicular manganese-containing iron oxide hydroxide particles, comprising at least one compound selected from the group consisting of hydroxides of aluminum, oxides of aluminum, hydroxides of silicon and oxides of silicon;
a coating layer formed on the said coat formed on the surface of the said acicular manganese-containing hematite particle or acicular manganese-containing iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising said organosilicon compound, in an amount of 1 to 20 parts by weight based on 100 parts by weight of the said acicular manganese-containing hematite particles or acicular manganese-containing iron oxide hydroxide particles.

In a fifth aspect of the present invention, there is provided a non-magnetic substrate comprising:
a non-magnetic base film; and
a non-magnetic undercoat layer formed on the said non-magnetic base film, comprising a binder resin and non-magnetic acicular black iron-based composite particles,
the said non-magnetic acicular black iron-based composite particles comprising:
acicular hematite particles or acicular iron oxide hydroxide particles having an average major axis diameter of 0.02 to 0.30 µm;
a coating layer formed on the surface of the said acicular hematite particle or acicular iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising said organosilicon compound coated, in an amount of 1 to 20 parts by weight based on 100 parts by weight of the said acicular hematite particles or acicular iron oxide hydroxide particles.

In a sixth aspect of the present invention, there is provided a non-magnetic substrate comprising:
a non-magnetic base film; and
a non-magnetic undercoat layer formed on the said non-magnetic base film, comprising a binder resin and non-magnetic acicular black iron-based composite particles,
the said non-magnetic acicular black iron-based composite particles comprising:
acicular hematite particles or acicular iron oxide hydroxide particles having an average major axis diameter of 0.02 to 0.30 µm;
a coat formed on at least a part of the surface of the said acicular hematite particles or acicular iron oxide hydroxide particles, comprising at least one compound selected from the group consisting of hydroxides of aluminum, oxides of aluminum, hydroxides of silicon and oxides of silicon;
a coating layer formed on the said coat formed on the surface of the said acicular hematite particle or acicular iron oxide hydroxide particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising said organosilicon compound, in an amount of 1 to 20 parts by weight based on 100 parts by weight of the said acicular hematite particles or acicular iron oxide hydroxide particles.

In a seventh aspect of the present invention, there is provided a non-magnetic substrate comprising:
a non-magnetic base film; and
a non-magnetic undercoat layer formed on the said non-magnetic base film, comprising a binder resin and non-magnetic acicular black iron-based composite particles,
said non-magnetic acicular black iron-based composite particles comprising:
acicular manganese-containing hematite particles or acicular manganese-containing iron oxide hydroxide particles having an average major axis diameter of 0.02 to 0.30 µm;
a coating layer formed on the surface of the said acicular manganese-containing hematite particle or acicular manganese-containing iron oxide hydroxide particle, comprising at least one organosilicon compound selected from the group consisting of:
(1) organosilane compounds obtained from an alkoxysilane compounds, (2) polysiloxanes or modified polysiloxanes, and
(3) fluoroalkyl organosilane compounds obtained from a fluoroalkylsilane compounds; and a carbon black coat formed on the said coating layer comprising said organosilicon compound, in an amount of 1 to 20 parts by weight based on 100 parts by weight of the said acicular manganese-containing hematite particles or acicular manganese-containing iron oxide hydroxide particles.

In an eighth aspect of the present invention, there is provided a non-magnetic substrate comprising:

a non-magnetic base film; and a non-magnetic undercoat layer formed on the said non-magnetic base film, comprising a binder resin and non-magnetic acicular black iron-based composite particles, the said non-magnetic acicular black iron-based composite particles comprising:

acicular manganese-containing hematite particles or acicular manganese-containing iron oxide hydroxide particles having an average major axis diameter of 0.02 to 0.30 µm;

a coat formed on at least a part of the surface of the said acicular manganese-containing hematite particles or acicular manganese-containing iron oxide hydroxide particles, comprising at least one compound selected from the group consisting of hydroxides of aluminum, oxides of aluminum, hydroxides of silicon and oxides of silicon;

a coating layer formed on the said coat formed on the surface of the said acicular manganese-containing hematite particle or acicular manganese-containing iron oxide hydroxide particle, comprising at least one organosilicon compound selected from the group consisting of:

(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising said organosilicon compound, in an amount of 1 to 20 parts by weight based on 100 parts by weight of the said acicular manganese-containing hematite particles or acicular manganese-containing iron oxide hydroxide particles.

DETAILED DESCRIPTION OF THE INVENTION

Figure 1:
FIG. 1 is an electron photograph (×60,000) showing a particle structure of acicular manganese-containing hematite particles used in Example 1.

A magnetic recording medium and a non-magnetic substrate therefor according to the present invention is described.

The magnetic recording medium according to the present invention comprises:

a non-magnetic base film;

a non-magnetic undercoat layer formed on the non-magnetic base film, comprising a binder resin and non-magnetic acicular black iron-based composite particles; and a magnetic coating film formed on the non-magnetic undercoat layer, comprising a binder resin and magnetic particles.

The non-magnetic substrate according to the present invention comprises:

a non-magnetic base film; and a non-magnetic undercoat layer formed on the non-magnetic base film, comprising a binder resin and the non-magnetic acicular black iron-based composite particles.

The non-magnetic particles contained in a non-magnetic undercoat layer according to the present invention are non-magnetic acicular black iron-based composite particles comprising:

acicular hematite particles or acicular iron oxide hydroxide particles having an average major axis diameter of 0.02 to 0.30 µm;

a coating layer formed on the surface of the acicular hematite particle or acicular iron oxide hydroxide particle, comprising at least one organosilicon compound, and a carbon black coat formed on the coating layer comprising the organosilicon compound coated, in an amount of 1 to 20 parts by weight based on 100 parts by weight of the acicular hematite particles or acicular iron oxide hydroxide particles.

The acicular hematite particles assume usually a red color and the acicular iron oxide hydroxide particles assume usually yellow color. In order to produce non-magnetic acicular black iron-based composite particles having a more excellent blackness, it is preferred to use acicular manganese-containing hematite particles or acicular manganese-containing goethite particles, both which contain manganese in an amount of 5 to 40% by weight based on the weight of the acicular manganese-containing hematite particles or acicular manganese-containing goethite particles, as the acicular hematite particles or manganese-containing goethite particles used as the core particles of the non-magnetic acicular black iron-based composite particles used in the present invention.

The particle shape of the acicular hematite particles or the acicular iron oxide hydroxide particles as the core particles may include not only acicular shape but also spindle shape, rice ball shape or the like.

The average major axis diameter of the acicular hematite particles or the acicular iron oxide hydroxide particles as the core particles is usually 0.02 to 0.3 µm. If the average major axis diameter thereof exceeds 0.3 µm, since the average major axis diameter of the obtained non-magnetic acicular black iron-based composite particles therefrom exceeds 0.3 µm, the surface smoothness of the coating film formed using such particles may be impaired. On the other hand, if the average major axis diameter thereof is less than 0.02 µm, the dispersion in the vehicle may be difficult because of the increase of the intermolecular force due to the fine particles. With the consideration of the dispersibility in the vehicle and the surface smoothness of the coating film, the average major axis diameter thereof is preferably 0.025 to 0.25 µm, more preferably 0.03 to 0.2 µm.

The average minor axis diameter of the acicular hematite particles or the acicular iron oxide hydroxide particles as the core particles is usually 0.01 to 0.15 μm. If the average minor axis diameter thereof exceeds 0.15 μm, since the average minor axis diameter of the obtained non-magnetic acicular black iron-based composite particles therefrom exceeds 0.15 μm, the surface smoothness of the coating film formed using such particles may be impaired. On the other hand, if the average minor axis diameter thereof is less than 0.01 μm, the dispersion in the vehicle may be difficult because of the increase of the intermolecular force due to the fine particles. With the consideration of the dispersibility in the vehicle and the surface smoothness of the coating film, the average minor axis diameter thereof is preferably 0.0125 to 0.125 μm, more preferably 0.05 to 0.1 μm.

The aspect ratio (=average major axis diameter: average minor axis diameter, hereinafter referred to merely as "aspect ratio") of the acicular hematite particles or the acicular iron oxide hydroxide particles as the core particlesis usually 2:1 to 20:1. When the aspect ratio is more than 20:1, the particles may be entangled with each other in vehicle, thereby causing a tendency that the dispersibility thereof may be deteriorated or the viscosity thereof may be increased. On the other hand, when the aspect ratio is less than 2:1, it may be difficult to obtain a coating film having a sufficient strength. With the consideration of the dispersibility in the vehicle and the strength of the coating film, the aspect ratio is preferably 2.5:1 to 18:1, more preferably 3:1 to 15:1.

The BET specific surface area ($S_{BET}$) of the acicular hematite particles or the acicular iron oxide hydroxide particles as the core particles is usually 35 to 250 m$^2$/g. If the BET specific surface area ($S_{BET}$) thereof is more than 250 m$^2$/g, the dispersion in the vehicle may be difficult because of the increase of the intermolecular force due to the fine particles. On the other hand, if the BET specific surface area ($S_{BET}$) thereof is less than 35 m$^2$/g, the acicular hematite particles or the acicular iron oxide hydroxide particles may be coarse particles or large particles produced by sintering a particle and between particles, which are apt to exert a deleterious influence on the surface smoothness of the coating film. With the consideration of the dispersibility in the vehicle and the surface smoothness of the coating film, the BET specific surface area ($S_{BET}$) thereof is preferably 38 to 200 m$^2$/g, more preferably 40 to 180 m$^2$/g.

The geometrical standard deviation of the major axis diameter of the acicular hematite particles or the acicular iron oxide hydroxide particles as the core particles is usually not more than 1.50. If the geometrical standard deviation of the major axis diameter thereof exceeds 1.50, the coarse particles existent sometimes exert a deleterious influence on the surface smoothness of the coating film. With the consideration of the surface smoothness of the coating film, the upper limit thereof is preferably 1.45, more preferably not more than 1.40. From the point of view of industrial productivity, the lower limit thereof is preferably 1.01.

With respect of the blackness of the acicular hematite particles as the core particles, in case of the acicular hematite particles, the lower limit of the blackness thereof, when represented by the L* value, is usually 18, and the upper limit thereof is usually 28, preferably 25. In the case of the acicular manganese-containing hematite particles, the lower limit of the blackness thereof as the core particles when represented by the L* value, is usually 18, and the upper limit thereof is usually 27, preferably 24.

With respect to the blackness of the acicular iron oxide hydroxide particles as the core particles, in the case of the acicular goethite particles, the lower limit of the blackness thereof, when represented by the L* value, is usually 18, and the upper limit thereof is usually 30, preferably 28, and in the case of the acicular manganese-containing goethite particles, the lower limit of the blackness thereof, when represented by the L* value, is usually 18, and the upper limit thereof is usually 29, preferably 27.

When the L* value is more than the above upper limit, the blackness of the core particles is insufficient, thereby failing to obtain the non-magnetic acicular black iron-based composite particles having an excellent blackness.

The volume resistivity of the acicular hematite particles or acicular iron oxide hydroxide particles as the core particles usually not more than 1×10$^8$ Ω·cm.

The coating layer formed on the surfaces of the core particles comprises at least one organosilicon compound selected from the group consisting of: (1) organosilane compounds obtained from alkoxysilane compounds; (2) polysiloxanes, or modified polysiloxanes selected from the group consisting of: (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group; and (3) fluoroalkyl organosilane compounds obtained from fluoroalkylsilane compounds.

The organosilane compounds (1) can be produced from alkoxysilane compounds represented by the formula (I):

wherein R$^1$ is C$_6$H$_5$—, (CH$_3$)$_2$CHCH$_2$— or n—C$_b$H$_{2b+1}$— (wherein b is an integer of 1 to 18); X is CH$_3$O— or C$_2$H$_5$O—; and a is an integer of 0 to 3.

The alkoxysilane compounds may be dried or heat-treated, for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the adhering effect of carbon black fine particles, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

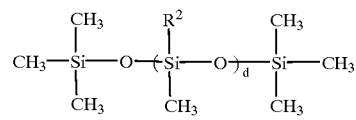

wherein R$^2$ is H— or CH$_3$—, and d is an integer of 15 to 450.

Among these polysiloxanes, in view of the desorption percentage and the adhering effect of carbon black fine particles, polysiloxanes having methyl hydrogen siloxane units are preferred.

As the modified polysiloxanes (2-A), there may be used:

(a1) polysiloxanes modified with polyethers represented by the formula (III):

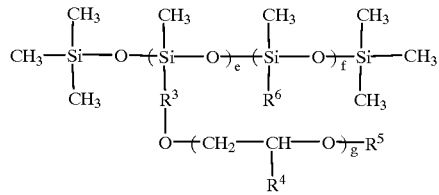

(III)

wherein $R^3$ is —$(—CH_2—)_h$—; $R^4$ is —$(—CH_2—)_i$—$CH_3$; $R^5$ is —OH, —COOH, —CH=CH$_2$, —C(CH$_3$)=CH$_2$ or —$(—CH_2—)_j$—CH$_3$; $R^6$ is —$(—CH_2—)_k$—CH$_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

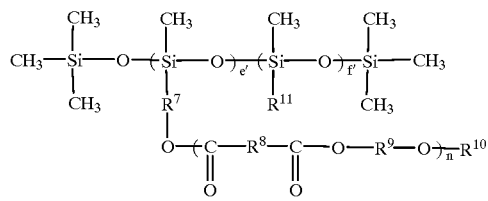

(IV)

wherein $R^7$, $R^8$ and $R^9$ are —$(—CH_2—)_q$— and may be the same or different; $R^{10}$ is —OH, —COOH, —CH=CH$_2$, —C(CH$_3$)=CH$_2$ or —$(—CH_2—)_r$—CH$_3$; $R^{11}$ is —$(—CH_2—)_s$—CH$_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

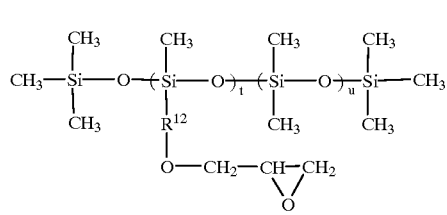

(V)

wherein $R^{12}$ is —$(—CH_2—)_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black fine particles, the polysiloxanes modified with the polyethers represented by the formula (III), are preferred.

As the terminal-modified polysiloxanes (2-B), there may be used those represented by the formula (VI):

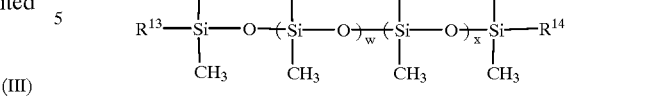

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —$(—CH_2—)_y$—; y is an integer of 1 to 15; w is an integer of 1 to 200; and x is an integer of 0 to 100.

Among these terminal-modified polysiloxanes, in view of the desorption percentage and the adhering effect of carbon black fine particles, the polysiloxanes whose terminals are modified with carboxylic acid groups are preferred.

The fluoroalkyl organosilane compounds (3) may be produced from fluoroalkylsilane compounds represented by the formula (VII):

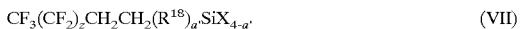

$CF_3(CF_2)_zCH_2CH_2(R^{18})_{a'}SiX_{4-a'}$.   (VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

The fluoroalkylsilane compounds may be dried or heat-treated, for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of carbon black fine particles, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the acicular hematite particles or the acicular iron oxide hydroxide particles coated with the organosilicon compounds.

When the amount of the coating layer composed of the organosilicon compounds is less than 0.02% by weight, it may become difficult to adhere a carbon black on the coating layer in such an amount enough to improve the blackness and volume resistivity thereof. On the other hand, even when the coating amount of the organosilicon compounds is more than 5.0% by weight, a sufficient amount of carbon black coat can be formed on the surface of the coating layer. However, it is meaningless because the blackness cannot be further improved by using such an excess amount of the organosilicon compounds.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA-100, MA7, #1000, #2400B, #30, MA8, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like. In view of the compatibility with the organosilicon compounds, MA-100, MA7, #1000, #2400B and #30 are preferred.

The lower limit of the average particle size of the carbon black fine particles used is usually 0.005 $\mu$m, preferably 0.01 $\mu$m, and upper limit thereof is usually 0.05 $\mu$m. preferably 0.035 $\mu$m. When the average particle size of the carbon black fine particles used is less than 0.005 $\mu$m, the carbon black fine particles used are too fine to be well handled.

On the other hand, when the average particle size thereof is more than 0.05 $\mu$m, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black formed is 1 to 20 parts by weight based on 100 parts by weight of the acicular hematite particles or acicular iron oxide hydroxide particles as the core particles. When the amount of the carbon black coat formed is less than 1 part by weight, the blackness of the obtained non-magnetic acicular black iron-based composite particles is unsatisfactory because of insufficient amount of the carbon black coat formed onto the coating layer. On the other hand, when the amount of the carbon black coat formed is more than 20 parts by weight, the carbon black tend to be desorbed from the coating layer because of too much amount of the carbon black coat formed thereonto, though the obtained non-magnetic acicular black iron-based composite particles can show a sufficient blackness. As a result, the dispersibility of the obtained non-magnetic acicular black iron-based composite particles in a vehicle is deteriorated.

The thickness of carbon black coat formed is preferably not more than 0.04 $\mu$m, more preferably not more than 0.03 $\mu$m, still more preferably not more than 0.02 $\mu$m. The lower limit thereof is more preferably 0.0001 $\mu$m.

The particle shape and particle size of the non-magnetic acicular black iron-based composite particles used as non-magnetic particles in the present invention are considerably varied depending upon those of acicular hematite particles or acicular iron oxide hydroxide particles as core particles. Specifically, the non-magnetic acicular black iron-based composite particles used as non-magnetic particles in the present invention are substantially similar in particle shape to that of the core particles, and have a slightly larger particle size than that of the core particles.

The non-magnetic acicular black iron-based composite particles used in the present invention have an average major axis diameter of usually 0.021 to 0.35 $\mu$m, preferably 0.026 to 0.30 $\mu$m, more preferably 0.035 to 0.25 $\mu$m; an average minor axis diameter of usually 0.0105 to 0.175 $\mu$m, preferably 0.013 to 0.15 $\mu$m, more preferably 0.0175 to 0.125 $\mu$m; an aspect ratio (average major axis diameter/average minor axis diameter) of usually 2:1 to 20:1, preferably 2.5:1 to 18:1, more preferably 3:1 to 15:1; and a BET specific surface area of usually 35 to 250 m$^2$/g, preferably 38 to 200 m$^2$/g, more preferably 40 to 180 m$^2$/g.

When the average major axis diameter of the non-magnetic acicular black iron-based composite particles is less than 0.021 $\mu$m, the intermolecular force between the particles may be increased due to the fineness thereof, so that it may become difficult to uniformly disperse the particles in a vehicle. On the other hand, when the average major axis diameter thereof is more than 0.35 $\mu$m, since the non-magnetic acicular black iron-based composite particles are coarse, the surface smoothness of the coating film formed using such particles may be impaired.

Further, it is preferred that the non-magnetic acicular black iron-based composite particles used in the present invention have a geometrical standard deviation of major axis diameter of not more than 1.50. When the geometrical standard deviation of major axis diameter is more than 1.50, since coarse particles tend to be present in the non-magnetic acicular black iron-based composite particles, the surface smoothness of the coating film formed using such particles may be impaired. With the consideration of the surface smoothness, the geometrical standard deviation of major axis diameter of the non-magnetic acicular black iron-based composite particles used in the present invention is preferably not more than 1.45, more preferably not more than 1.40. Further, in view of industrial production of the non-magnetic acicular black iron-based composite particles, the lower limit of the geometrical standard deviation of major axis diameter is preferably 1.01.

The upper limit of the blackness of the non-magnetic acicular black iron-based composite particles used in the present invention is usually 23.5 when represented by a L* value thereof. When the L* value as the upper limit of the blackness is more than 23.5, since the lightness of the non-magnetic acicular black iron-based composite particles is increased, it is difficult to reduce the light transmittance of the magnetic recording medium. The preferable upper limit of the blackness thereof is 23.0. The upper limit of the blackness of the non-magnetic acicular black iron-based composite particles obtained by using the acicular manganese-containing hematite particles or the acicular manganese-containing iron oxide hydroxide particles as the core particles, is usually 22.0, preferably 21.0 when represented by a L* value thereof. The lower limit of the blackness is preferably about 15 when represented by a L* value.

The volume resistivity of the non-magnetic acicular black iron-based composite particles used in the present invention is preferably not more than 1×10$^8$ $\Omega$·cm, more preferably 1×10$^5$ to 5×10$^7$ $\Omega$·cm, still more preferably 1×10$^5$ to 1×10$^7$ $\Omega$·cm. When the volume resistivity is more than 1×10$^8$ $\Omega$·cm, it is difficult to sufficiently lower the surface resistivity of the magnetic recording medium.

The percentage of desorption of carbon black from the non-magnetic acicular black iron-based composite particles used in the present invention is usually not more than 20%, preferably not more than 10%. When the desorption percentage of carbon black is more than 20%, the desorbed carbon black tend to inhibit the composite particles from being uniformly dispersed in a vehicle upon the production of non-magnetic coating composition.

In the non-magnetic acicular black iron-based composite particles used in the present invention, the surfaces of the acicular hematite particles or the acicular iron oxide hydroxide particles as the core particles may be preliminarily coated with at least one compound selected from the group consisting of hydroxide of aluminum, oxides of aluminum, hydroxides of silicon and oxides of silicon (hereinafter referred to as "hydroxides and/or oxides of aluminum and/or silicon coat"), if required. In this case, the dispersibility of the obtained composite particles in a vehicle may become improved as compared to those having no undercoat composed of hydroxides or oxides of aluminum or silicon.

The amount of the hydroxides and/or oxides of aluminum and/or silicon coat is 0.01 to 50% by weight calculated as Al, $SiO_2$ or a sum of Al and $SiO_2$, based on the weight of the acicular hematite particles or the acicular iron oxide hydroxide particles as the core particles. When the amount of the hydroxides and/or oxides of aluminum and/or silicon coat is less than 0.01% by weight, the improvement of the dispersibility of the obtained composite particles in a vehicle cannot be achieved. On the other hand, when the amount of the hydroxides and/or oxides of aluminum and/or silicon coat is more than 50% by weight, the obtained composite particles can exhibit a good dispersibility in a vehicle, but it is meaningless because the dispersibility cannot be further improved by using such an excess amount of the hydroxides and/or oxides of aluminum and/or silicon coat.

The non-magnetic acicular black iron-based composite particles using as core particles the acicular hematite particles or the acicular iron oxide hydroxide particles having the coat composed of the the hydroxides and/or oxides of aluminum and/or silicon may be substantially identical in a particle size, a geometrical standard deviation, a BET specific surface area, a blackness (L* value) and a volume resistivity, to those having no hydroxides and/or oxides of aluminum and/or silicon coat.

Next, the process for producing the non-magnetic acicular black iron-based composite particles used in the present invention, is described.

The acicular goethite particles as the core particles may be produced by a so-called wet process, i.e., by passing an oxygen-containing gas such as air through a suspension containing either ferrous hydroxide colloid, iron carbonate or iron-containing precipitates obtained by reacting a ferrous salt aqueous solution with alkali hydroxide, alkali carbonate or both of alkali hydroxide and alkali carbonate, and then after filtering-out and washing with water.

The acicular hematite particles as the core particles may be produced by heat-treating the obtained acicular goethite particles at a temperature of 250 to 850° C. in an oxygen-containing gas such as air.

The acicular manganese-containing hematite particles as the core particles may be produced by heat-treating acicular goethite particles containing manganese in an amount of 8 to 150 atomic % based on whole Fe which are obtained by the below-mentioned method, at a temperature of 250 to 850° C. in an oxygen-containing gas such as air.

The acicular manganese-containing goethite particles as the core particles may be produced by conducting the above-mentioned wet process for producing the acicular goethite particles, in the presence of manganese, thereby forming acicular goethite particles containing manganese in an amount of 8 to 150 atomic % based on whole Fe.

Alternatively, elements other than Fe such as Ni, Zn, P and Si, which are generally added in order to enhance various properties of the particles such as the major axis diameter, the minor axis diameter and the aspect ratio, may be added during the reaction system for producing the goethite particles.

Especially, in advance of the heat-dehydration of the acicular goethite particles for producing the acicular hematite particles, it is preferred that the surfaces of the acicular goethite particles are coated with sintering preventive, as is well known in the art. The coating treatment of the sintering preventive is composed of the steps of: adding the sintering preventive to an aqueous suspension containing the acicular goethite particles, mixing and stirring the resultant suspension, filtering out the particles, washing the particles with water, and drying the particles.

As the sintering preventive, known sintering preventives are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nitrate, alkali aluminate such as sodium aluminate, alumina sol and aluminum hydroxide, and titanium compounds such as titanyl sulfate may be exemplified. Orthophosphoric acid, colloidal silica, boric acid and aluminum acetate are preferable.

The coating of the acicular hematite particles or the acicular iron oxide hydroxide particles with the alkoxysilane compounds, the polysiloxanes, the modified polysiloxanes, the terminal-modified polysiloxanes or the fluoroalkylsilane compounds, may be conducted (i) by mechanically mixing and stirring the acicular hematite particles or the acicular iron oxide hydroxide particles together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the acicular hematite particles or the acicular iron oxide hydroxide particles. In these cases, substantially whole amount of the alkoxysilane compounds, the polysiloxanes, the modified polysiloxanes, the terminal-modified polysiloxanes or the fluoroalkylsilane compounds added can be applied onto the surfaces of the acicular hematite particles or the acicular iron oxide hydroxide particles.

In order to uniformly coat the surfaces of the acicular hematite particles or the acicular iron oxide hydroxide particles with the alkoxysilane compounds, the polysiloxanes, the modified polysiloxanes, the terminal-modified polysiloxanes or the fluoroalkylsilane compounds, it is preferred that the acicular hematite particles or the acicular iron oxide hydroxide particles are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spatulate-force and compressed-force at the same time. In addition, by conducting the above mixing or stirring treatment (a) of the core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the core particles may be changed to the organosilane compounds and fluoroalkyl organosilane compounds, respectively.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm, preferably 10 to 150 Kg/cm, more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the acicular hematite particles or the acicular iron oxide hydroxide particles. When the amount of the alkoxysilane compounds, the polysiloxanes, the modified polysiloxanes, the terminal-modified polysiloxanes or the fluoroalkylsilane compounds added is less than 0.15 part by weight, it may become difficult to form the carbon black coat in such an amount enough to improve the blackness and volume resistivity of the obtained composite particles. On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black coat can be formed on the surface of the coating layer, but it is meaningless because the blackness and volume resistivity of the composite particles cannot be further improved by using such an excess amount of the alkoxysilane compounds, the polysiloxanes, the modified polysiloxanes, the terminal-modified polysiloxanes or the fluoroalkylsilane compounds added.

Next, the carbon black fine particles are added to the acicular hematite particles or the acicular iron oxide hydroxide particles coated with the alkoxysilane compounds, the polysiloxanes, the modified polysiloxanes, the terminal-modified polysiloxanes or the fluoroalkylsilane compounds added, and the resultant mixture is mixed and stirred to form the carbon black coat on the surfaces of the coating layer composed of the alkoxysilane compounds, the polysiloxanes, the modified polysiloxanes, the terminal-modified polysiloxanes or the fluoroalkylsilane compounds added. In addition by conducting the above mixing or stirring treatment (b) of the carbon black fine particles together with the acicular hematite particles or the acicular iron oxide hydroxide particles coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the the acicular hematite particles or the acicular iron oxide hydroxide particles may be changed to the organosilane compounds and fluoroalkyl organosilane compounds, respectively.

In the case where the alkoxysilane compounds and the fluoroalkylsilane compounds are used as the coating compound, after the carbon black coat is formed on the surface of the coating layer, the resultant composite particles may be dried or heat-treated, for example, at a temperature of usually 40 to 200° C., preferably 60 to 150° C. for usually 10 minutes to 12 hours, preferably 30 minutes to 3 hours, thereby forming a coating layer composed of the organosilane compounds (1) and the fluoroalkyl organosilane compounds (3), respectively.

It is preferred that the carbon black fine particles are added little by little and slowly, especially about 5 to 60 minutes.

In order to form carbon black onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm, preferably 10 to 150 Kg/cm more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 20 parts by weight based on 100 parts by weight of the acicular hematite particles or the acicular iron oxide hydroxide particles. When the amount of the carbon black fine particles added is less than 1 part by weight, it may become difficult to form the carbon black coat in such an amount enough to improve the blackness and volume resistivity of the obtained composite particles. On the other hand, when the amount of the carbon black fine particles added is more than 20 parts by weight, a sufficient blackness and volume resistivity of the resultant composite particles can be obtained, but the carbon black tend to be desorbed from the surface of the coating layer because of too large amount of the carbon black adhered, resulting in deteriorated dispersibility in a vehicle.

At least a part of the surface of the acicular hematite particles or the acicular iron oxide hydroxide particles may be coated with at least one compound selected from the group consisting of hydroxides of aluminum, oxides of aluminum, hydroxides of silicon and oxides of silicon, if required, in advance of mixing and stirring with the alkoxysilane compounds, the polysiloxanes, the modified polysiloxanes, the terminal-modified polysiloxanes or the fluoroalkylsilane compounds.

The coat of the hydroxides and/or oxides of aluminum and/or silicon may be conducted by adding an aluminum compound, a silicon compound or both the compounds to a water suspension in which the acicular hematite particles or the acicular iron oxide hydroxide particles are dispersed, followed by mixing and stirring, and further adjusting the pH of the suspension, if required, thereby coating the surfaces of the acicular hematite particles or the acicular iron oxide hydroxide particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate, alumina sols or the like.

The amount of the aluminum compound added is 0.01 to 50% by weight (calculated as Al) based on the weight of the acicular hematite particles or the acicular iron oxide hydroxide particles. When the amount of the aluminum compound added is less than 0.01% by weight, it may be difficult to sufficiently coat the surfaces of the acicular hematite particles or the acicular iron oxide hydroxide particles with hydroxides or oxides of aluminum or silicon, thereby failing to achieve the improvement of the dispersibility in a vehicle. On the other hand, when the amount of the aluminum compound added is more than 50% by weight, the coating effect is saturated and, therefore, it is meaningless to add such an excess amount of the aluminum compound.

As the silicon compounds, there may be exemplified #3 water glass, sodium orthosilicate, sodium metasilicate, colloidal silica or the like.

The amount of the silicon compound added is 0.01 to 50% by weight (calculated as $SiO_2$) based on the weight of the acicular hematite particles or the acicular iron oxide hydroxide particles. When the amount of the silicon compound added is less than 0.01% by weight, it may be difficult to sufficiently coat the surfaces of the acicular hematite particles or the acicular iron oxide hydroxide particles with hydroxides or oxides of silicon, thereby failing to achieve the improvement of the dispersibility in a vehicle. On the other hand, when the amount of the silicon compound added is more than 50% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50% by weight (calculated as a sum of Al and $SiO_2$) based on the weight of the acicular hematite particles or the acicular iron oxide hydroxide particles.

The non-magnetic substrate according to the present invention is produced by forming as the non-magnetic undercoat layer a coating film on the non-magnetic base film and drying. The coating film is formed by applying a non-magnetic coating composition which contains the non-magnetic acicular black iron-based composite particles, a binder resin and a solvent, to the surface of the non-magnetic base film.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm. In the case of a magnetic disc, polyethylene terephthalate is usually used as the non-magnetic base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —$SO_3M$, —$OPO_2M_2$ and —$NH_2$, wherein M represents H, Na or K. With the consideration of the dispersibility of the particles, a binder resin containing a functional group —COOH or —$SO_3M$ is preferable.

The mixing ratio of the non-magnetic acicular black iron-based composite particles with the binder resin is usually 5 to 2000 parts by weight, preferably 100 to 1000 parts by weight based on 100 parts by weight of the binder resin.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the non-magnetic acicular black iron-based composite particles. When the amount of the solvent used is less than 50 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc. which are generally used for the production of a magnetic recording medium to the non-magnetic undercoat layer.

The thickness of the non-magnetic undercoat layer is usually 0.2 to 10.0 μm, preferably 0.5 to 5.0 μm. If the thickness is less than 0.2 μm, not only it is impossible to ameliorate the surface roughness of the non-magnetic substrate but also the strength is insufficient. If the thickness is more than 10 μm, it is difficult to reduce the thickness of the magnetic recording medium.

The non-magnetic substrate according to the present invention has the following properties.

In case of using the non-magnetic acicular black iron-based composite particles as non-magnetic particles, in which the organosilicon compound is formed on the surface of the acicular hematite particle or acicular iron oxide hydroxide particle, the non-magnetic substrate according to the present invention has a gloss (of the coating film) of usually 170 to 280%, preferably 180 to 280%, more preferably 185 to 280%; a surface roughness Ra (of the coating film) of usually 0.5 to 15.0 nm, preferably 0.5 to 13.0 nm, more preferably 0.5 to 12.0 nm; a Young'ss modulus (relative value to a commercially available video tape: and AV T-120 produced by Victor Company of Japan, Limited) of usually 120 to 150, preferably 122 to 150; a linear adsorption coefficient (of the coating film) of usually 1.30 to 5.00 $\mu m^{-1}$, preferably 1.35 to 5.00 $\mu m^{-1}$; and a surface resistivity of not more than $1 \times 10^{12}$ Ω/sq, preferably $1 \times 10^5$ to $3 \times 10^{11}$ Ω/sq.

In case of using the non-magnetic acicular black iron-based composite particles as non-magnetic particles, in which the organosilicon compound is formed on the hydroxides and/or oxides of aluminum and/or silicon coat which are formed on the surface of the acicular hematite particle or acicular iron oxide hydroxide particle, the non-magnetic substrate according to the present invention has a gloss (of the coating film) of usually 175 to 300%, preferably 180 to 300%, more preferably 185 to 300%; a surface roughness Ra (of the coating film) of usually 0.5 to 13.0 nm, preferably 0.5 to 12.0 nm, more preferably 0.5 to 11.0 nm; a Young's modulus (relative value to a commercially available video tape: and AV T-120 produced by Victor Company of Japan, Limited) of usually 122 to 150, preferably 124 to 150; a linear adsorption coefficient (of the coating film) of usually 1.30 to 5.00 $\mu m^{-1}$, preferably 1.35 to 5.00 $\mu m^{-1}$; and a surface resistivity of not more than $1 \times 10^{12}$ Ω/sq, preferably $1 \times 10^5$ to $5 \times 10^{11}$ Ω/sq.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the magnetic particles used in the present invention, magnetic particles containing iron as a main component are usable, and there may be exemplified magnetic iron oxide particles such as maghemite particles, magnetite particles and berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; Co modified particles obtained by modifying the said magnetic iron oxide particles with cobalt; magnetic acicular metal particles containing iron as a main component and elements other than Fe at least one selected from the group consisting of Co, Al, Ni, P, Si, Zn, B, Nd, La and Y, including magnetic acicular iron-based alloy particles; magnetoplumbite-type ferrite particles such as plate-like ferrite particles containing Ba, Sr or Ba-Sr; plate-like magnetoplumbite-type ferrite particles obtained by incorporating other metals such as Co, Ni, Zn, Mg, Mn, Ti, Sn, Zr or the like as a coercive force-reducing agent in the plate-like magnetoplumbite-type ferrite particles; or the like. With the consideration of the short-wavelength recording and the high-density recording, magnetic acicular metal particles containing iron as a main component and magnetic acicular iron-based alloy particles containing elements other than Fe at least one selected from the group consisting of Co, Al, Ni, P, Si, Zn, B, Nd, La, Y or the like are preferable.

The magnetic acicular metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular metal particles containing iron as a main component comprising iron, Al and at least one rare-earth metal such as Nd, La and Y is most preferable.

More specifically, the magnetic acicular metal particles containing iron as a main component may be exemplified as follows.

1) Magnetic acicular metal particles comprises iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprises iron; and aluminum of usually 0.05 to 10% by weight, preferably 0.1 to 7% by weight (calculated as Al) based on the weight of the magnetic acicular metal particles.

3) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprises iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the particles is the balance, and is preferably 50 to 99% by weight, more preferably 60 to 95% by weight (calculated as Fe) based on the weight of the magnetic acicular metal particles containing iron as a main component.

The magnetic particles containing iron as a main component used in the present invention have an average major axis diameter of usually 0.01 to 0.50 µm, preferably 0.03 to 0.30 µm, an average minor axis diameter of usually 0.0007 to 0.17 µm, preferably 0.003 to 0.10 µm. It is preferred that the shape of the magnetic particles containing iron as a main component is acicular, cubic or plate-like. The acicular shape may include not only needle-shape but also spindle-shape, rice ball-shape, or the like.

In the case that the shape of the magnetic particles is acicular, the magnetic particles have an aspect ratio of usually not less than 3:1, preferably and not less than 5:1. The upper limit of the aspect ratio is usually 15:1, preferably 10:1 with the consideration of the dispersibility in the vehicle.

In the case that the shape of the magnetic particles is plate-like, the magnetic particles have an aspect ratio (an average plate surface diameter/average plate thickness) of usually not less than 2:1, preferably and not less than 3:1. The upper limit of the aspect ratio is usually 20:1, preferably 15:1 with the consideration of the dispersibility in the vehicle.

The geometrical standard deviation of the major axis diameter of the magnetic particles used in the present invention is preferably not more than 2.50 in. If it exceeds 2.50, the coarse particles existent sometimes exert a deleterious influence on the surface smoothness of the magnetic recording layer. From the point of view of industrial productivity, the lower limit of the geometrical standard deviation of the major axis diameter is preferably 1.01.

As to the magnetic properties of the magnetic particles used in the present invention, the coercive force is usually 250 to 4000 Oe, and the saturation magnetization is usually 40 to 170 emu/g.

As to the magnetic properties of the magnetic iron oxide particles used in the present invention, the coercive force is usually 250 to 1700 Oe, preferably 300 to 1700 Oe, and the saturation magnetization is usually 60 to 90 emu/g, preferably 65 to 90 emu/g.

As to the magnetic properties of the magnetic acicular metal particles containing iron as a main component used in the present invention, the coercive force is usually 800 to 3500 Oe, preferably 900 to 3500 Oe, and the saturation magnetization is usually 90 to 170 emu/g, preferably 100 to 170 emu/g.

As to the magnetic properties of the magnetoplumbite-type ferrite particles used in the present invention, the coercive force is usually 800 to 4000 Oe, preferably 900 to 4000 Oe, and the saturation magnetization is usually 40 to 70 emu/g, preferably 45 to 70 emu/g.

As the binder resin for the magnetic recording layer, the same binder resin as that used for the production of the non-magnetic undercoat layer is usable.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the magnetic particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc., which are generally used for the production of a magnetic recording medium to the magnetic recording layer.

The thickness of the magnetic recording layer obtained by applying the magnetic coating composition on the surface of the non-magnetic undercoat layer and dried, is usually in the range of 0.01 to 5.0 µm. If the thickness is less than 0.01 µm, uniform coating may be difficult, so that unfavorable phenomenon such as unevenness on the coating surface is observed. On the other hand, when the thickness exceeds 5.0 µm, it may be difficult to obtain desired signal recording property due to an influence of diamagnetism. The preferable thickness is in the range of 0.05 to 1.0 µm.

The magnetic recording medium according to the present invention has the following properties.

The magnetic recording medium according to the present invention has a coercive force of usually 250 to 4000 Oe; a squareness (residual magnetic flux density Br/saturation magnetic flux density Bm) of usually 0.85 to 0.95; a gloss (of the coating film) of usually 130 to 300%; a surface roughness Ra (of the coating film) of usually not more than 12.0 nm; a Young's modulus (relative value to a commercially available video tape: AV T-120 produced by Victor Company of Japan, Limited) of usually not less than 124; a linear adsorption coefficient (of the coating film) of usually 1.20 to 5.00 $\mu m^{-1}$; and a surface resistivity of not more than $1\times10^{10}$ Ω/sq.

In case of using non-magnetic substrate wherein the non-magnetic acicular black iron-based composite particles in which the organosilicon compound is formed on the surface of the coat composed of the hydroxides and/or oxides of aluminum and/or silicon which are formed on the surface of the acicular hematite particle or acicular iron oxide hydroxide particle, are used as non-magnetic particles, the magnetic recording medium according to the present invention has a coercive force of usually 250 to 4000 Oe; a squareness (residual magnetic flux density Br/saturation magnetic flux density Bm) of usually 0.85 to 0.95; a gloss (of the coating film) of usually 135 to 300%; a surface roughness Ra (of the coating film) of usually not more than 11.8 nm; a Young's modulus (relative value to a commercially available video tape: AV T-120 produced by Victor Company of Japan, Limited) of usually not less than 126; a linear adsorption coefficient (of the coating film) of usually 1.20 to 5.00 $\mu m^{-1}$; and a surface resistivity of not more than $1\times10^{10}$ Ω/sq.

In case of using magnetic iron oxide particles as the magnetic particles, the magnetic properties of the magnetic recording medium according to the present invention are a coercive force of usually 250 to 1700 Oe, preferably 300 to 1700 Oe; a squareness (residual magnetic flux density Br/saturation magnetic flux density Bm) of usually 0.85 to 0.95, preferably 0.86 to 0.95.

In case of using magnetic acicular metal particles containing iron as a main component as the magnetic particles, the magnetic properties of the magnetic recording medium according to the present invention are a coercive force of usually 800 to 3500 oe, preferably 900 to 3500 Oe; a squareness (residual magnetic flux density Br/saturation magnetic flux density Bm) of usually 0.87 to 0.95, preferably 0.88 to 0.95.

In case of using plate-like magnetoplumbite-type ferrite particles as the magnetic particles, the magnetic properties of the magnetic recording medium according to the present invention are a coercive force of usually 800 to 4000 Oe, preferably 900 to 4000 Oe; a squareness (residual magnetic flux density Br/saturation magnetic flux density Bm) of usually 0.85 to 0.95, preferably 0.86 to 0.95.

Especially, in case of using the non-magnetic substrate as set forth the fifth aspect and magnetic acicular metal particles containing iron as a main component as the magnetic particles, the magnetic recording medium according to the present invention has a gloss (of the coating film) of usually 180 to 300%, preferably 190 to 300%; a surface roughness Ra (of the coating film) of usually not more than 11.0 nm, preferably 2.0 to 10.5 nm, more preferably 2.0 to 10.0 nm; a Young's modulus (relative value to a commercially available video tape: AV T-120 produced by Victor Company of Japan, Limited) of usually 124 to 160, preferably 128 to 160; a linear adsorption coefficient (of the coating film) of usually 1.20 to 5.00 $\mu m^{-1}$, preferably 1.25 to 5.00 $\mu m^{-1}$; and a surface resistivity of not more than $1\times10^{10}$ Ω/sq, preferably not more than $7.5\times10^{9}$ Ω/sq.

In case of using the non-magnetic substrate as set forth the sixth aspect and magnetic acicular metal particles containing iron as a main component as the magnetic particles, the magnetic recording medium according to the present invention has a gloss (of the coating film) of usually 185 to 300%, preferably 195 to 300%; a surface roughness Ra (of the coating film) of usually not more than 10.5 nm, preferably 2.0 to 10.0 nm, more preferably 2.0 to 9.5 nm; a Young's modulus (relative value to a commercially available video tape: AV T-120 produced by Victor Company of Japan, Limited) of usually 126 to 160, preferably 130 to 160; a linear adsorption coefficient (of the coating film) of usually 1.20 to 5.00 $\mu m^{-1}$, preferably 1.25 to 5.00 $\mu m^{-1}$; and a surface resistivity of not more than $1\times10^{10}$ Ω/sq, preferably not more than $7.5\times10^{9}$ Ω/sq.

The essential of the present invention lies in such a fact that in the case where the non-magnetic acicular black iron-based composite particles comprising: acicular hematite particles or acicular iron oxide hydroxide particles having an average major axis diameter of 0.02 to 0.3 µm, which may be coated with at least one compound selected from the group consisting of hydroxides of aluminum, oxides of aluminum, hydroxides of silicon and oxides of silicon; a coating layer formed on the surfaces of the said particles, comprising at least one organosilicon compound selected from the group consisting of (1) organosilane compounds obtained from alkoxysilane compounds, (2) polysiloxanes, or modified polysiloxanes and (3) fluoroalkyl organosilane compounds obtained from fluoroalkylsilane compounds; and a carbon black coat formed on the coating layer in a total amount of 1 to 20 parts by weight based on 100 parts by weight of the acicular hematite particles or acicular iron oxide hydroxide particles, are used as non-magnetic particles for the non-magnetic undercoat layer, since the amount of the carbon black desorbed from the surface of the non-magnetic acicular black iron-based composite particle is small, it is possible to more improve a surface smoothness of the non-magnetic undercoat layer and a strength of the non-magnetic substrate, and to more reduce a light transmittance and electric resistance thereof even when the amount of carbon black contained is reduced as low as possible. Further, in the case where a magnetic recording layer is formed on such a non-magnetic undercoat layer, it is possible to obtain a magnetic recording medium having a more smooth surface, a high strength, and a lower light transmittance and a lower electric resistance even when the a mount of carbon black fine particle s added in the magnetic recording layer is reduced as low as possible.

The reason why the amount of the carbon black desorbed from the surfaces of the non-magnetic acicular black iron-based composite particles is small, is considered such that the organosilicon compounds onto which the carbon black coat is formed, are strongly bonded to the surface of the acicular hematite particle or the acicular iron oxide hydroxide particle as a core particle.

Especially, in the case of using the alkoxysilane compounds or the fluoroalkylsilane compounds, metalloxane bonds ($\equiv$Si—O—M, wherein M represents a metal atom contained in the acicular hematite particle or the acicular iron oxide hydroxide particle as a core particle, such as Si, Al or Fe) are formed between the metal elements such as Si, Al or Fe which are contained within the acicular hematite particle or the acicular iron oxide hydroxide particle or present at the surface thereof, and alkoxy groups of the alkoxysilane compounds or the fluoroalkylsilane compounds on which the carbon black coat is formed, so that the organosilicon compounds onto which the carbon black coat is formed, can be more strongly bonded to the surface of the acicular hematite particle or the acicular iron oxide hydroxide particle.

The reason why the black iron-based composite particles used in the present invention can show an excellent dispersibility in vehicles is considered as follows. That is, due to the face that the amount of the carbon black desorbed from the surface of the non-magnetic acicular black iron-based composite particle is small, it is unlikely that the dispersion in the system is inhibited by the carbon black desorbed. Further, since the carbon black coat is formed on the surface of the non-magnetic acicular black iron-based composite particle, irregularities are formed thereon, because the contact between the particles is suppressed.

The reason why the substrate and the magnetic recording medium can show a low light transmittance even at a small carbon black content, is considered such that in the non-magnetic acicular black iron-based composite particles, the carbon black coat can be uniformly and densely formed on the surfaces of the acicular hematite particles or acicular iron oxide hydroxide particles, and can be dispersed in such a condition close to primary particles.

The reason why the substrate and the magnetic recording medium can show a lower electric resistance even at a small carbon black content, is considered such that since the acicular hematite particles or the acicular iron oxide hydroxide particles are uniformly dispersed in a coating film while keeping a mutual contact between surfaces thereof, the carbon black coat uniformly and densely formed to the surfaces of the acicular hematite particles or acicular iron oxide hydroxide particles, can also be continuously connected with each other while keeping a mutual contact therebetween.

In accordance with the present invention, due to the fact that the non-magnetic acicular black iron-based composite particles as non-magnetic particles have an excellent dispersibility, it is possible to improve a surface smoothness of the non-magnetic undercoat layer and a strength of the non-magnetic substrate. In addition, due to the fact that the non-magnetic acicular black iron-based composite particles as non-magnetic particles can show an excellent blackness and a low electric resistance even at a small carbon black content, it is possible to reduce a light transmittance and an electric resistance of the non-magnetic substrate. Thus, by using such a non-magnetic undercoat layer, the obtained magnetic recording medium can also exhibit a more smooth surface, a high strength, and a lower light transmittance and a lower electric resistance even when the amount of carbon black contained therein is reduced as low as possible. Accordingly, the magnetic recording medium according to the present invention can be suitably applied to those for high-density recording.

The non-magnetic acicular black iron-based composite particles used in the present invention have an excellent dispersibility in vehicles, resulting in excellent handling property and workability and, therefore, are industrially advantageous.

Further, the magnetic recording medium according to the present invention has a small carbon black content and, therefore, is favorable in view of safety and hygiene.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameters of acicular hematite particles, acicular iron oxide hydroxide particles, carbon black fine particles, non-magnetic acicular black iron-based composite particles and magnetic particles were respectively expressed by average values (measured in a predetermined direction) of about 350 particles which were sampled from a micrograph obtained by magnifying an original electron micrograph (×20,000) by four times in each of the longitudinal and transverse directions.

(2) The aspect ratio of the particles was expressed by a ratio of average major axis diameter to minor axis diameter thereof.

(3) The Geometrical standard deviation of particle sizes was expressed by values obtained by the following method. That is, the particle sizes were measured from the above-magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50 % and 84.13 %, respectively, were read from the graph, and the geometrical standard deviation was measured from the following formula:

Geometrical standard deviation={particle size corresponding to 84.13% under integration sieve}/{particle size (geometrical average diameter) corresponding to 50% under integration sieve}

The more the geometrical standard deviation nears 1.0, the more excellent the particle size distribution of the particles.

(4) The specific surface area was expressed by values measured by a BET method.

(5) The amounts of Mn, Al and Si which were present within acicular hematite particles, acicular iron oxide hydroxide particles and non-magnetic acicular black iron-based composite particles or on the surfaces thereof, and the amount of Si contained in organosilicon compounds, were measured by a fluorescent X-ray spectroscopy device 3063 (manufactured by RIGAKU DENKI KOGYO CO., LTD.) according to JIS K0119 "General rule of fluorescent X-ray analysis".

(6) The amount of carbon black coat formed on the non-magnetic acicular black iron-based composite particles was measured by "Horiba Metal, Carbon and Sulfur Analyzer EMIA-2200 Model" (manufactured by HORIBA SEISAKUSHO CO., LTD.).

(7) The thickness of carbon black coat formed on the surfaces of the black iron-based composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The blackness of acicular hematite particles, acicular iron oxide hydroxide particles and non-magnetic acicular black iron-based composite particles, were measured by the following method. That is, 0.5 g of sample particles and 0.7 cc of castor oil were intimately kneaded together by a Hoover's muller to form a paste. 4.5 g of clear lacquer was added to the obtained paste and was intimately mixed to form a paint. The paint was applied on a cast-coated paper by using a 6-mil applicator to produce a coating film piece (having a film thickness of about 30 $\mu$m). The thus obtained coating film piece was measured according to JIS Z 8729 by a multi-light source spectrographic colorimeter MSC-IS-2D (manufactured by SUGA TESTING MACHINES MANU-FACTURING CO., LTD.) to determine a L* value of colorimetric indices thereof.

(9) The volume resistivity of the acicular hematite particles, the acicular iron oxide hydroxide particles and the non-magnetic acicular black iron-based composite particles were measured as follows. First, 0.5 g of the respective particles were weighed, and pressure-molded into a cylindrical shape at 140 Kg/cm$^2$ using a KBr tablet machine (manufactured by SIMAZU SEISAKUSHO CO., LTD.), thereby producing a cylindrical sample to be measured.

The thus-produced sample was then exposed to an atmosphere kept at a temperature of 25° C. and a relative humidity of 60%, for not less than 12 hours. Thereafter, the sample was fixed between stainless steel electrodes, and a voltage of 15V was applied to the sample using a Wheatstone bridge (TYPE2768, manufactured by YOKOGAWA-HOKUSHIN DENKI CO., LTD.), thereby measuring a resistance value R ($\Omega$) of the sample.

Next, an upper surface area A (cm$^2$) and a thickness $t_0$ (cm) of the cylindrical sample were measured, and the respective measured values were substituted for A and $t_0$ of the following formula to obtain the volume resistivity X ($\Omega$·cm) of the sample.

$$X(\Omega\cdot cm)=R\times(A/t_0)$$

(10) The desorption percentage (T %) of carbon black desorbed from the non-magnetic acicular black iron-based composite particles was measured by the following method.

That is, 3 g of the non-magnetic acicular black iron-based composite particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the non-magnetic acicular black iron-based composite particles on the basis of the difference in specific gravity therebetween. Next, the thus separated non-magnetic acicular black iron-based composite particles were mixed again with 40 ml of ethanol, and the obtained mixture was further subjected to ultrasonic dispersion for 20 minutes. Thereafter, the obtained dispersion was allowed to stand for 120 minutes, thereby separating the non-magnetic acicular black iron-based composite particles and carbon black desorbed, from each other. The thus separated non-magnetic acicular black iron-based composite particles were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (T %) was calculated according to the following formula:

$$T(\%)=\{(W_a-W_e)/W_a\}\times100$$

wherein $W_a$ represents an amount of carbon black initially adhered on the non-magnetic acicular black iron-based composite particles; and $W_e$ represents an amount of carbon black which still remains on the non-magnetic acicular black iron-based composite particles after the above desorption test.

The closer to zero the desorption percentage (T %), the smaller the amount of carbon black desorbed from the non-magnetic acicular black iron-based composite particles.

(11) The viscosity of the coating composition was obtained by measuring the viscosity of the coating composition at 25° C. at a shear rate D of 1.92 sec$^{-1}$ by using "E type viscometer EMD-R" (manufactured by TOKYO KEIKI, CO., LTD.).

(12) The gloss of the surface of the coating film of each of the non-magnetic undercoat layer and the magnetic recording layer was measured at an angle of incidence of 45° by "glossmeter UGV-5D" (manufactured by SUGA SHIKENKI, CO., LTD.).

(13) The surface roughness Ra is expressed by the center-line average roughness of the surface of the coating film by using "Surfcom-575A" (manufactured by TOKYO SEIMITSU CO., LTD.).

(14) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by VICTOR COMPANY OF JAPAN, LIMITED). The higher the relative value, the more the strength of the coating film is favorable.

(15) The magnetic properties of the magnetic particles and magnetic recording medium were measured under an external magnetic field of 10 kOe by "Vibration Sample Magnetometer VSM-3S-15 (manufactured by TOEI KOGYO, CO., LTD.)".

(16) The light transmittance is expressed by the linear adsorption coefficient measured by using "UV-Vis Recording Spectrophotometer UV-2100" (manufactured by SHIMAZU SEISAKUSHO, LTD.). The linear adsorption coefficient is defined by the following formula, and the larger the value, the more the transmittance of light become difficult:

Linear adsorption coefficient ($\mu m^{-1}$)={1 n (1/t)}/FT wherein t represents a light transmittance (–) at $\lambda$=900 nm, and FT represents thickness ($\mu$m) of the coating composition of the film used for the measurement.

(17) The surface resistivity value of a coating film was measured as follows. The coating film to be measured was exposed to an atmosphere kept at a temperature of 25° C. and a relative humidity of 60%, for not less than 12 hours. Thereafter, the coating film was slit into 6 mm width, and then placed on metal electrodes each having a width of 6.5 mm such that a coating surface thereof was contacted with the metal electrodes. Two 170-gram weights were fitted to opposite ends of the coating film so as to bring the coating film into close contact with the metal electrodes. Then, a D.C. voltage of 500V was applied between the metal electrodes, thereby measuring a surface resistivity value of the coating film.

(18) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

<Production of Non-magnetic Acicular Black Iron-based Composite Particles>

20 kg of acicular manganese-containing hematite particles obtained according to the method described in Japanese Patent Application Laid-open (KOKAI) No. 7-66020 (1995) and shown in the electron photograph (×60,000) of FIG. 1 (average major axis diameter: 0.151 $\mu$m; average minor axis diameter: 0.0220 $\mu$m; aspect ratio: 6.9:1; geometrical standard deviation of major axis diameter: 1.35; BET specific surface area value: 50.9 m$^2$/g; Mn content: 13.3 wt. %; and blackness (L* value): 29.7; volume resistivity: 7.5×10$^8$ Ω·cm), were diaggregated in 150 liters of pure water using a stirrer, and further passed through a TK pipeline homomixer (manufactured by TOKUSHU KIKA KOGYO CO., LTD.) three times, to obtain a slurry containing the acicular manganese-containing hematite particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the acicular manganese-containing hematite particles were dispersed.

The acicular manganese-containing hematite particles in the obtained slurry, which remain on a sieve of 325 meshes (mesh size: 44 $\mu$m) was 0 %. The slurry was filtered and washed with water, thereby obtaining a wet cake composed of the acicular manganese-containing hematite particles. The obtained wet cake composed of the acicular manganese-containing hematite particles was dried at 120° C. 11.0 kg of the dried particles were then charged into an edge runner "MPUV-2 Model" (tradename, manufactured by MATSU-MOTO CHUZO TEKKOSHO CO., LTD.), and mixed and stirred at 60 Kg/cm for 30 minutes, thereby lightly diaggregating the particles.

220 g of methyl triethoxysilane was mixed and diluted with 200 ml of ethanol to obtain a solution of methyl triethoxysilane. The methyl triethoxysilane solution was added to the thus diaggregated acicular manganese-containing hematite particles while operating the edge runner. The acicular manganese-containing hematite particles were continuously mixed and stirred at a linear load of 60 Kg/cm and a stirring speed of 22 rpm for 60 minutes.

Figure 2:
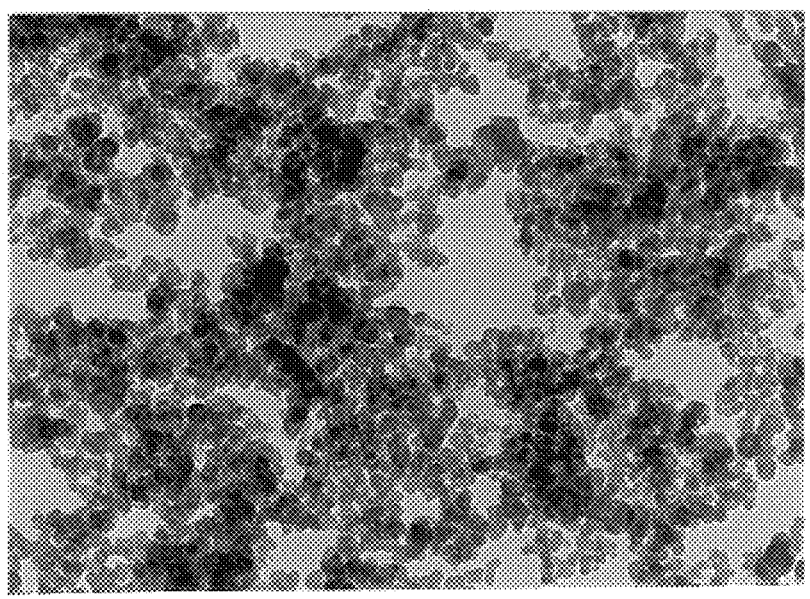
FIG. 2 is an electron photograph (×60,000) showing a particle structure of carbon black fine particles used in Example 1.

Next, 550 g of carbon black fine particles as shown in the electron photograph (×60,000) of FIG. 2 (particle shape: granular shape; average particle size: 0.022 $\mu$m; geometrical standard deviation of particle sizes: 1.68; BET specific surface area value: 134 m$^2$/g; and blackness (L* value): 16.6), were added to the acicular manganese-containing hematite particles coated with methyl triethoxysilane for 10 minutes while operating the edge runner. Further, the particles were continuously mixed and stirred at a linear load of 60 Kg/cm and a stirring speed of 22 rpm for 60 minutes to form a carbon black coat on the coating layer composed of methyl triethoxysilane, thereby obtaining non-magnetic acicular black iron-based composite particles.

Figure 3:
FIG. 3 is an electron photograph (×60,000) showing a particle structure of non-magnetic acicular black iron-based composite particles obtained in Example 1.

The obtained non-magnetic acicular black iron-based composite particles were dried or heat-treated at 105° C. for 60 minutes by using a drier. The resultant non-magnetic acicular black iron-based composite particles had an average major axis diameter of 0.151 $\mu$m, an average minor axis diameter of 0.0222 $\mu$m and an aspect ratio of 6.8:1 as shown in the electron photograph (×60,000) of FIG. 3. In addition, the non-magnetic acicular black iron-based composite particles showed a geometrical standard deviation of major axis diameter of 1.35, a BET specific surface area value of 52.5 m$^2$/g, a blackness (L* value) of 19.8, a volume resistivity: 3.3×10$^4$ Ω·cm and a desorption percentage of carbon black fine particles: 6.5%. The amount of a coating organosilane compound produced from methyl triethoxysilane was 0.31% by weight (calculated as Si). The amount of the carbon black coat formed on the coating layer composed of the organosilane compound produced from methyl triethoxysilane is 4.72% by weight (calculated as C) based on the weight of the black iron-based composite particles (corresponding to 5 parts by weight based on 100 parts by weight of the acicular manganese-containing hematite particles). The thickness of the carbon black coat formed was 0.0022 $\mu$m. Since no carbon black were recognized on the electron photograph of FIG. 3, it was confirmed that a whole amount of the carbon black used contributed to the formation of the carbon black coat on the coating layer composed of the organosilane compound produced from methyl triethoxysilane.

Figure 4:
FIG. 4 is an electron photograph (×60,000) showing a particle structure of mixed particles of acicular manganese-containing hematite particles and carbon black fine particles for comparative purposes.

For a comparative purpose, the acicular manganese-containing hematite particles not coated with methyl triethoxysilane and the carbon black fine particles were mixed and stirred together by an edge runner in the same manner as described above, thereby obtaining treated particles as shown in the electron photograph (×60,000) of FIG. 4. As shown in FIG. 4, it was recognized that the carbon black fine particles were not adhered on the acicular manganese-containing hematite particles, and the individual particles were present separately.

<Production of Non-magnetic Substrate: Formation of Non-magnetic Undercoat Layer on Base Film>

12 g of the non-magnetic acicular black iron-based composite particles obtained in the above were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene= 1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the non-magnetic acicular black iron-based composite particles was as follows:

Non-magnetic acicular black iron-based composite particles 100 parts by weight

Vinyl chloride-vinyl acetate copolymer resin having a sodium sulfonate group 10 parts by weight Polyurethane resin having a sodium sulfonate group 10 parts by weight Cyclohexanone 44.6 parts by weight Methylethyl ketone 111.4 parts by weight Toluene 66.9 parts by weight The non-magnetic coating composition obtained was applied to a polyethylene terephthalate film of 12 $\mu$m thick to a thickness of 55 μm by an applicator, and the coating film was then dried, thereby forming a non-magnetic undercoat layer. The thickness of the non-magnetic undercoat layer was 3.3 μm.

The thus obtained non-magnetic undercoat layer had a gloss of 198%, and a surface roughness Ra of 6.4 nm. The Young's modulus (relative value) thereof was 121. The linear adsorption coefficient (of the coating film) thereof was 1.83 μm$^{-1}$; and the surface resistivity thereof was 1.7× 10$^9$ Ω/sq.

Example 2
<Production of Magnetic Recording Medium: Formation of Magnetic Recording Layer>

12 g of magnetic acicular metal particles containing iron as a main component (average major axis diameter: 0.115 μm, average minor axis diameter: 0.0182 μm, aspect ratio: 6.3:1, coercive force: 1910 Oe, saturation magnetization: 131 emu/g), 1.2 g of a polishing agent (AKP-30: trade name, produced by SUMITOMO CHEMICAL CO., LTD.), 0.12 g of carbon black (#3250B, trade name, produced by MITSUBISHI CHEMICAL CORP.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

Magnetic acicular metal particles containing iron as a main component 100 parts by weight Vinyl chloride-vinyl acetate copolymer resin having a sodium sulfonate group 10 parts by weight Polyurethane resin having a sodium sulfonate group 10 parts by weight Polishing agent (AKP-30) 10 parts by weight Carbon black (#3250B) 1.0 parts by weight Lubricant (myristic acid:butyl stearate=1:2) 3.0 parts by weight Hardening agent (polyisocyanate) 5.0 parts by weight Cyclohexanone 65.8 parts by weight Methyl ethyl ketone 164.5 parts by weight Toluene 98.7 parts by weight The magnetic coating composition obtained was applied to the non-magnetic undercoat layer to a thickness of 15 μm by an applicator, and the magnetic recording medium obtained was oriented and dried in a magnetic field, and then calendered. The magnetic recording medium was the n subjected to a curing reaction at 60° C. for 24 hours, and thereafter slit into a width of 0.5 inch, thereby obtaining a magnetic tape. The thickness of the respective magnetic recording layer was 1.2 μm.

The coercive force Hc of the magnetic tape produced by forming a magnetic recording layer on the non-magnetic undercoat layer was 2037 Oe, the squareness (Br/Bm) thereof was 0.87, the gloss thereof was 223%, the surface roughness Ra thereof was 6.3 nm, the Young's modulus (relative value) thereof was 133, the linear absorption coefficient thereof was 2.08 μm$^{-1}$, and the surface resistivity of 1.3×10$^8$ Ω/sq.

Core Particles 1 to 5

Various acicular hematite particles and acicular iron oxide hydroxide particle, (goethite) particles produced by known methods, were prepared. The same procedure as defined in Example 1 was conducted by using these particles, thereby obtaining diaggregated acicular hematite particles and acicular iron oxide hydroxide particles.

Various properties of the acicular hematite particles and acicular iron oxide hydroxide particles as core particles are shown in Table 1.

Meanwhile, the core particles 5 were acicular goethite particles produced by the method described in Japanese Patent Application Laid-open (KOKAI) No. 4-144924 (1992). The core particles 3 were acicular hematite particles produced by heat-dehydrating the acicular goethite particles obtained by the method described in Japanese Patent Application Laid-open (KOKAI) No. 4-144924(1992).

Core particles 6

The same procedure as defined in Example 1 was conducted by using 20 kg of the diaggregated acicular hematite particles (core particles 1) and 150 liters of water, thereby obtaining a slurry containing the acicular manganese-containing hematite particles. The pH value of the obtained re-dispersed slurry containing the acicular manganese-containing hematite particles was adjusted to 10.5, and then the concentration of the solid content in the slurry was adjusted to 98 g/liter by adding water thereto. After 150 liters of the slurry was heated to 60° C., 5444 ml of a 1.0 mol/liter NaAlO$_2$ solution (corresponding to 1.0% by weight (calculated as Al) based on the weight of the acicular manganese-containing hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the acicular manganese-containing hematite particles whose surface was coated with hydroxides of aluminum.

The thus obtained acicular manganese-containing hematite particles whose surface was coated with hydroxides of aluminum had average major axis diameter: 0.143 μm; average minor axis diameter: 0.0210 μm; and aspect ratio: 6.8:1. The geometrical standard deviation of major axis diameter was 1.37, the BET specific surface area value was 54.9 m$^2$/g, the blackness (L* value) was 28.4, and the volume resistivity was 4.6×10$^8$ Ω·cm. As a result of fluorescent X-ray analysis, the obtained particles had an Al content of 0.98% by weight.

Core Particles 7 to 10

The same procedure as defined above for the production of the core particles 6, was conducted except that kinds of core particles and kinds and amounts of additives used in the above surface treatment were changed variously, thereby obtaining surface-treated acicular hematite particles and surface-treated acicular iron oxide hydroxide particles.

The essential treating conditions are shown in Table 2, and various properties of the obtained surface-treated core particles are shown in Table 3.

Production Examples 1 to 10 and Production Comparative Examples 1 to 5

The same procedure as defined in Example 1 was conducted except that kinds of acicular hematite particles and acicular iron oxide hydroxide particles, addition or non-addition of alkoxysilane, kinds and amounts of alkoxysilane added, treating conditions of an edge runner used in the alkoxysilane-coating process, kinds and amounts of the carbon black coat formed, and treating conditions of an edge runner used in the process for forming the carbon black coat, were changed variously, thereby obtaining non-magnetic acicular black iron-based composite particles. As a result of the observation by an electron microscope, carbon black were not recognized in the non-magnetic acicular black iron-based composite particles obtained in Production Examples 1 to 10. Therefore, it was confirmed that a substantially whole amount of the carbon black used in Production Examples 1 to 10 contributed to the formation of the carbon black coat on the coating layer composed of an organosilane compound produced from the alkoxysilane.

Various properties of the carbon black fine particles A to C used, are shown in Table 4. The essential treating conditions are shown in Table 5, and various properties of the obtained non-magnetic acicular black iron-based composite particles are shown in Table 6.

Examples 3 to 12 and Comparative Examples 1 to 13

<Production of Non-magnetic Substrate: Formation of Non-magnetic Undercoat Layer on Non-magnetic Base Film>

By using the non-magnetic acicular black iron-based composite particles obtained in Production Example 1 to 10 and Production Comparative Examples 1 to 5, core particles 1 to 5 and carbon black fine particles A to C, non-magnetic undercoat layers were formed in the same way as in Example 1.

The main producing conditions and various properties are shown in Table 7.

Examples 13 to 22 and Comparative Examples 14 to 26

<Production of Magnetic Recording Medium: Formation of Magnetic Coating Film>

Magnetic recording media were produced in the same way as in Example 2 except for varying the kind of non-magnetic undercoat layer and the kind of magnetic particles. Various properties of the magnetic particles (1) to (4) used, are shown in Table 8.

The main producing conditions shown in Table 9 and various properties are shown in Tables 9 and 10.

Production Example 11

220 g of methyl hydrogen polysiloxane (tradename: "TSF484", produced by TOSHIBA SILICONE CO., LTD.) was added to 11.0 kg of the diaggregated acicular manganese-containing hematite particles obtained by the same way as in Example 1, while operating an edge runner "MPUV-2 Model" (manufactured by MATSUMOTO CHUZO TEKKOSHO CO., LTD.), and then continuously mixed and stirred at a linear load of 40 Kg/cm and a stirring speed of 22 rpm for 30 minutes.

Next, 550 g of carbon black fine particles (particle shape: granular shape; particle size: 0.022 $\mu$m; geometrical standard deviation of particle sizes: 1.68; BET specific surface area value: 134 m$^2$/g; and blackness (L* value): 16.6) were added to the acicular manganese-containing hematite particles coated with methyl hydrogen polysiloxane, for 10 minutes while operating the edge runner. Further, the obtained particles were continuously mixed and stirred at a linear load of 40 Kg/cm and a stirring speed of 22 rpm for 20 minutes to form a carbon black coat on the coating layer composed of methyl hydrogen polysiloxane, thereby obtaining non-magnetic acicular black iron-based composite particles.

The obtained non-magnetic acicular black iron-based composite particles were dried at 105° C. for 60 minutes by using a drier.

The obtained non-magnetic acicular black iron-based composite particles were granular particles having an average major axis diameter of 0.151 $\mu$m, an average minor axis diameter of 0.0221 $\mu$m and an aspect ratio of 6.8:1. In addition, the geometrical standard deviation of major axis diameter of the non-magnetic acicular black iron-based composite particles was 1.35; the BET specific surface area value was 51.8 m$^2$/g; the Mn content was 12.4% by weight; the blackness (L* value) was 18.6; the volume resistivity was $2.6 \times 10^4$ $\Omega \cdot$cm; and the carbon black desorption percentage was 6.3%. The coating amount of the methyl hydrogen polysiloxane was 0.82% by weight (calculated as Si). The amount of the carbon black coat formed on the the coating layer composed of methyl hydrogen polysiloxane is 4.73% by weight (calculated as C) based on the weight of the black iron-based composite particles (corresponding to 5 parts by weight based on 100 parts by weight of the acicular manganese-containing hematite particles). The thickness of the carbon black coat formed was 0.0022 $\mu$m. As a result of the observation by an electron microscope, since almost carbon black was not recognized in the obtained composite particles, it was confirmed that substantially a whole amount of the carbon black used contributed to the formation of the carbon black coat on the coating layer composed of the methyl hydrogen polysiloxane.

Production Examples 12 to 21 Production Comparative Examples 6 to 8

The same procedure as defined in Production Example 11 was conducted except that kinds of acicular hematite particles and acicular iron oxide hydroxide particles as the core particles, kinds and amounts of polysiloxane added, treating conditions of an edge runner used in the polysiloxane-coating process, kinds and amounts of a carbon black coat formed, and treating conditions of an edge runner used in the process for forming the carbon black coat, were changed variously, thereby obtaining non-magnetic acicular black iron-based composite particles. As a result of the observation by an electron microscope, almost no carbon black was recognized in the non-magnetic acicular black iron-based composite particles obtained in Production Examples 12 to 21. Therefore, it was confirmed that substantially a whole amount of the carbon black used contributed to the formation of the carbon black coat on the coating layer composed of polysiloxane.

The essential treating conditions are shown in Table 11, and various properties of the obtained non-magnetic acicular black iron-based composite particles are shown in Table 12.

Examples 23 to 33 and Comparative Examples 27 to 29

<Production of Non-magnetic Substrate: Formation of Non-magnetic Undercoat Layer on Non-magnetic Base Film>

By using the non-magnetic acicular black iron-based composite particles obtained in Production Example 11 to 21 and Production Comparative Examples 6 to 8, non-magnetic undercoat layers were formed in the same way as in Example 1.

The main producing conditions and various properties are shown in Table 13.

Examples 34 to 44 and Comparative Examples 30 to 32

<Production of Magnetic Recording Medium: Formation of Magnetic Coating Film>

Magnetic recording media were produced in the same way as in Example 2 except for varying the kind of non-magnetic undercoat layer and the kind of magnetic particles.

The main producing conditions and various properties are shown in Table 14.

Production Example 22

220 g of polyether-modified polysiloxane (tradename "BYK-080", produced by BYK-Chemie CO., LTD.) were added to 11.0 kg of the diaggregated acicular manganese-containing hematite particles obtained by the same way as in Example 1 particles 1, while operating an edge runner "MPUV-2 Model" (manufactured by MATSUMOTO CHUZO TEKKOSHO CO., LTD.), and then continuously mixed and stirred at a linear load of 40 Kg/cm a stirring speed of 22 rpm for 30 minutes.

Next, 550 g of carbon black fine particles (particle shape: granular shape; particle size: 0.022 $\mu$m; geometrical standard deviation of particle sizes: 1.68; BET specific surface area: 134 $m^2/g$; and blackness (L* value) : 16.6) were added to the acicular manganese-containing hematite particles coated with polyether-modified polysiloxane, for 10 minutes while operating the edge runner. Further, the obtained particles were continuously mixed and stirred at a linear load of 40 Kg/cm a stirring speed of 22 rpm for 20 minutes to form the carbon black coat on the coating layer composed of polyether-modified polysiloxane, thereby obtaining non-magnetic acicular black iron-based composite particles.

The obtained non-magnetic acicular black iron-based composite particles were dried at 105° C. for 60 minutes by using a drier. The obtained non-magnetic acicular black iron-based composite particles had an average major axis diameter of 0.151 $\mu$m, an average major axis diameter of 0.0221 $\mu$m and an aspect ratio of 6.8:1. In addition, the geometrical standard deviation of major axis diameters of the non-magnetic acicular black iron-based composite particles was 1.35; the BET specific surface area value was 53.1 $m^2/g$; the Mn content was 12.3% by weight; and the volume resistivity was $3.1 \times 10^4$ $\Omega$·cm; the blackness (L* value) was 18.5; the carbon black desorption percentage was 5.8%. The coating amount of the polyether-modified polysiloxane was 0.34% by weight (calculated as Si). The amount of the carbon black coat formed on the coating layer composed of the polyether-modified polysiloxane is 4.75% by weight (calculated as C) based on the weight of the black iron-based composite particles (corresponding to 5 parts by weight based on 100 parts by weight of the acicular manganese-containing hematite particles). The thickness of the carbon black coat formed was 0.0022 $\mu$m. As a result of the observation by an electron microscope, since almost no carbon black wasrecognized in the obtained composite particles, it was confirmed that substantially a whole amount of the carbon black used contributed to the formation of the carbon black coat on the coating layer composed of the polyether-modified polysiloxane.

Production Examples 23 to 32 and Production Comparative Examples 9 to 11

The same procedure as defined in Production Example 22 was conducted except that kinds of acicular hematite particles and acicular iron oxide hydroxide particles as the core particles, kinds and amounts of modified polysiloxane added, treating conditions of an edge runner used in the modified polysiloxane-coating process, kinds and amounts of a carbon black coat formed, and treating conditions of an edge runner used in the process for forming the carbon black coat, were changed variously, thereby obtaining non-magnetic acicular black iron-based composite particles. As a result of the observation by an electron microscope, almost no carbon black was recognized in the non-magnetic acicular black iron-based composite particles obtained in Production Examples 23 to 32. Therefore, it was confirmed that substantially a whole amount of the carbon black used contributed to the formation of the carbon black coat on the coating layer composed of modified polysiloxane.

The essential treating conditions are shown in Table 15, and various properties of the obtained non-magnetic acicular black iron-based composite particles are shown in Table 16.

Examples 45 to 55 and Comparative Examples 33 to 35

<Production of Non-magnetic Substrate: Formation of Non-magnetic Undercoat Layer on Non-magnetic Base Film>

By using the non-magnetic acicular black iron-based composite particles obtained in Production Example 22 to 32 and Production Comparative Examples 9 to 11, non-magnetic undercoat layers were formed in the same way as in Example 1.

The main producing conditions and various properties are shown in Table 17.

Examples 56 to 66 and Comparative Examples 36 to 38

<Production of Magnetic Recording Medium: Formation of Magnetic Coating Film>

Magnetic recording media were produced in the same way as in Example 2 except for varying the kind of non-magnetic undercoat layer and the kind of magnetic particles.

The main producing conditions and various properties are shown in Table 18.

Production Example 33

220 g of carboxylic acid-terminal-modified polysiloxane (tradename: "TSF4770", produced by TOSHIBA SILICONE CO., LTD.) was added to 11.0 kg of the diaggregated acicular manganese-containing hematite particles obtained by the same way as in Example 1, while operating an edge runner "MPUV-2 Model" (manufactured by MATSUMOTO CHUZO TEKKOSHO CO., LTD.), and then continuously mixed and stirred at a linear load of 40 Kg/cm and a stirring speed of 22 rpm for 30 minutes.

Next, 550 g of carbon black fine particles (particle shape: granular shape; particle size: 0.022 $\mu$m; geometrical standard deviation of particle sizes: 1.68; BET specific surface area value: 134 $m^2/g$; and blackness (L* value): 16.6) were added to the acicular manganese-containing hematite particles coated with carboxylic acid-terminal-modified polysiloxane, for 10 minutes while operating the edge runner. Further, the obtained particles were continuously mixed and stirred at a linear load of 40 Kg/cm and a stirring speed of 22 rpm for 20 minutes to form the carbon black coat on the coating layer composed of carboxylic acid-terminal-modified polysiloxane, thereby obtaining non-magnetic acicular black iron-based composite particles.

The obtained non-magnetic acicular black iron-based composite particles were dried at 105° C. for 60 minutes by using a drier. The obtained non-magnetic acicular black iron-based composite particles were granular particles having an average major axis diameter of 0.151 $\mu$m, an average major axis diameter of 0.0221 μm and an aspect ratio of 6.8:1. In addition, the geometrical standard deviation of major axis diameters of the non-magnetic acicular black iron-based composite particles was 1.35; the BET specific surface area value was 53.4 m$^2$/g; the Mn content was 12.3% by weight; and the volume resistivity was 2.3×10$^4$ Ω·cm; the blackness (L* value) was 18.7; the carbon black desorption percentage was 7.1%. The coating amount of the carboxylic acid-terminal-modified polysiloxane was 0.44% by weight (calculated as Si). The amount of the carbon black coat formed on the coating layer composed of carboxylic acid-terminal-modified polysiloxane is 4.72% by weight (calculated as C) based on the weight of the black iron-based composite particles (corresponding to 5 parts by weight based on 100 parts by weight of the acicular manganese-containing hematite particles). The thickness of the carbon black coat formed was 0.0022 μm. As a result of the observation by an electron microscope, since almost no carbon black was recognized in the obtained composite particles, it was confirmed that substantially a whole amount of the carbon black used contributed to the formation of the carbon black coat on the coating layer composed of carboxylic acid-terminal-modified polysiloxane.

Production Examples 34 to 43 and Production Comparative Examples 12 to 14

The same procedure as defined in Production Example 33 was conducted except that kinds of acicular hematite particles and acicular iron oxide hydroxide particles as the core particles, kinds and amounts of terminal-modified polysiloxane added, treating conditions of an edge runner used in the terminal-modified polysiloxane-coating process, kinds and amounts of a carbon black coat formed, and treating conditions of an edge runner used in the process for forming the carbon black coat, were changed variously, thereby obtaining non-magnetic acicular black iron-based composite particles. As a result of the observation by an electron microscope, almost no carbon black was recognized in the non-magnetic acicular black iron-based composite particles obtained in Production Examples 34 to 43. Therefore, it was confirmed that substantially a whole amount of the carbon black used contributed to the formation of the carbon black coat on the coating layer composed of terminal-modified polysiloxane.

The essential treating conditions are shown in Table 19, and various properties of the obtained non-magnetic acicular black iron-based composite particles are shown in Table 20.

Examples 67 to 77 and Comparative Examples 39 to 41

<Production of Non-magnetic Substrate: Formation of Non-magnetic Undercoat Layer on Non-magnetic Base Film>

By using the non-magnetic acicular black iron-based composite particles obtained in Production Example 33 to 43 and Production Comparative Examples 12 to 14, non-magnetic undercoat layers were formed in the same way as in Example 1.

The main producing conditions and various properties are shown in Table 21.

Examples 78 to 88 Comparative Examples 42 to 44
<Production of Magnetic Recording Medium: Formation of Magnetic Coating Film>

Magnetic recording media were produced in the same way as in Example 2 except for varying the kind of non-magnetic undercoat layer and the kind of magnetic particles.

The main producing conditions and various properties are shown in Table 22.

Production Example 44

220 g of tridecafluorooctyl trimethoxysilane (tradename "TSL8257", produced by TOSHIBA SILICONE CO., LTD.) were added to 11.0 kg of the diaggregated acicular manganese-containing hematite particles obtained by the same way of in Example 1, while operating an edge runner "MPUV-2 Model" (manufactured by MATSUMOTO CHUZO TEKKOSHO CO., LTD.), and then continuously mixed and stirred at a linear load of 40 Kg/cm and a stirring speed of 22 rpm for 30 minutes.

Next, 550 g of carbon black fine particles (particle shape: granular shape; particle size: 0.022 μm; geometrical standard deviation of particle sizes: 1.68; BET specific surface area value: 134 m$^2$/g; and blackness (L* value): 16.6) were added to the acicular manganese-containing hematite particles coated with tridecafluorooctyl trimethoxysilane, for 10 minutes while operating the edge runner. Further, the obtained particles were continuously mixed and stirred at a linear load of 40 Kg/cm and a stirring speed of 22 rpm for 20 minutes to form a carbon black coat on the coating layer composed of tridecafluorooctyl trimethoxysilane, thereby obtaining non-magnetic acicular black iron-based composite particles.

The obtained non-magnetic acicular black iron-based composite particles were dried or heat-treated at 105° C. for 60 minutes by using a drier. The obtained non-magnetic acicular black iron-based composite particles had an average major axis diameter of 0.151 μm, an average major axis diameter of 0.0222 μm and an aspect ratio of 6.9:1. In addition, the geometrical standard deviation of major axis diameters of the non-magnetic acicular black iron-based composite particles was 1.35; the BET specific surface area value was 53.2 m$^2$/g; the Mn content was 12.4% by weight; and the volume resistivity was 2.7×10$^4$ Ω·cm; the blackness (L* value) was 18.6; the carbon black desorption percentage was 7.0%. The coating amount of the fluoroalkyl organosilane compound produced from tridecafluorooctyl trimethoxysilane was 0.13% by weight (calculated as Si). The amount of the carbon black coat formed on the coating layer composed of the fluoroalkyl organosilane compound produced from tridecafluoroalkyl trimethoxysilane is 4.71% by weight (calculated as C) based on the weight of the black iron-based composite particles (corresponding to 5 parts by weight based on 100 parts by weight of the acicular manganese-containing hematite particles). The thickness of the carbon black coat formed was 0.0022 μm. As a result of the observation by an electron microscope, since almost no carbon black was recognized in the obtained composite particles, it was confirmed that substantially a whole amount of the carbon black used contributed to the formation of the carbon black coat on the coating layer composed of the fluoroalkyl organosilane compound produced from tridecafluoroalkyl trimethoxysilane.

Production Examples 45 to 54 and Production Comparative Examples 15 to 17

The same procedure as defined in Production Example 44 was conducted except that kinds of acicular hematite particles and acicular iron oxide hydroxide particles as the core particles, kinds and amounts of fluoroalkyl silane compounds added, treating conditions of an edge runner used in the fluoroalkyl silane compound-coating process, kinds and amounts of a carbon black coat adhered, and treating conditions of an edge runner used in the process for forming the carbon black coat, were changed variously, thereby obtaining non-magnetic acicular black iron-based composite particles. As a result of the observation by an electron microscope, almost no carbon black was recognized in the non-magnetic acicular black iron-based composite particles obtained in Production Examples 45 to 54. Therefore, it was confirmed that substantially a whole amount of the carbon black used contributed to the formation of the carbon black coat on the coating layer composed of fluoroalkyl organosilane compounds.

The essential treating conditions are shown in Table 23, and various properties of the obtained non-magnetic acicular black iron-based composite particles are shown in Table 24.

Examples 89 to 99 and Comparative Examples 45 to 47

<Production of Non-magnetic Substrate: Formation of Non-magnetic Undercoat Layer on Non-magnetic Base Film>

By using the non-magnetic acicular black iron-based composite particles obtained in Production Examples 44 to 54 and Production Comparative Examples 15 to 17, non-magnetic undercoat layers were formed in the same way as in Example 1.

The main producing conditions and various properties are shown in Table 25.

Examples 100 to 110 and Comparative Examples 48 to 50

<Production of Magnetic Recording Medium: Formation of Magnetic Coating Film>

Magnetic recording media were produced in the same way as in Example 2 except for varying the kind of non-magnetic undercoat layer and the kind of magnetic particles.

The main producing conditions and various properties are shown in Table 26.

TABLE 1

Properties of acicular hematite particles or acicular iron oxide hydroxide particles

| Core particles | Kind | Particle shape | Average major axis diameter ($\mu$m) | Average minor axis diameter ($\mu$m) | Aspect ratio (–) | Geometrical standard deviation (–) | BET specific surface area (m$^2$/g) | Mn content (wt. %) | Volume resistivity ($\Omega \cdot$ cm) | Blackness (L* value) (–) |
|---|---|---|---|---|---|---|---|---|---|---|
| Core particles 1 | Hematite particles | Acicular | 0.143 | 0.0210 | 6.8:1 | 1.38 | 55.3 | — | $2.3 \times 10^8$ | 28.3 |
| Core particles 2 | Hematite particles | Spindle-shaped | 0.187 | 0.0240 | 7.8:1 | 1.33 | 43.3 | — | $8.6 \times 10^8$ | 32.6 |
| Core particles 3 | Mn-containing hematite particles | Acicular | 0.158 | 0.0211 | 7.5:1 | 1.43 | 53.6 | 9.0 | $3.2 \times 10^7$ | 25.4 |
| Core particles 4 | Goethite particles | Acicular | 0.240 | 0.0272 | 8.8:1 | 1.37 | 86.3 | — | $9.6 \times 10^7$ | 34.6 |
| Core particles 5 | Mn-containing goethite particles | Acicular | 0.189 | 0.0220 | 8.6:1 | 1.41 | 110.6 | 8.1 | $2.6 \times 10^7$ | 28.3 |

TABLE 2

| Core particles | Kind of core particles | Surface-treating process | | |
|---|---|---|---|---|
| | | Kind | Calculated as | Amount (wt. %) |
| | | Additives | | |
| Core particles 6 | Core particles 1 | Sodium aluminate | Al | 1.0 |
| Core particles 7 | Core particles 2 | #3 Water glass | SiO$_2$ | 0.5 |
| Core particles 8 | Core particles 3 | Aluminum sulfate | Al | 1.5 |
| | | #3 Water glass | SiO$_2$ | 0.5 |
| Core particles 9 | Core particles 4 | Sodium aluminate | Al | 1.0 |
| | | Colloidal silica | SiO$_2$ | 3.0 |
| Core particles 10 | Core particles 5 | Aluminum acetate | Al | 5.5 |
| | | Coating material | | |
| Core particles 6 | | A | Al | 0.98 |
| Core particles 7 | | S | SiO$_2$ | 0.48 |
| Core particles 8 | | A | Al | 1.47 |
| | | S | SiO$_2$ | 0.46 |
| Core particles 9 | | A | Al | 0.96 |
| | | S | SiO$_2$ | 2.81 |
| Core particles 10 | | A | Al | 5.21 |

Note;
A: Hydroxide of aluminum
S: Oxide of silicon

TABLE 3

Properties of surface-treated core particles

| Core particles | Average major axis diameter (μm) | Average minor axis diameter (μm) | Aspect ratio (—) | Geometrical standard deviation (—) | BET specific surface area (m²/g) | Mn content (wt. %) | Volume resistivity (Ω · cm) | Blackness (L* value) (—) |
|---|---|---|---|---|---|---|---|---|
| Core particles 6 | 0.143 | 0.0210 | 6.8:1 | 1.37 | 54.9 | — | 4.6 × 10⁸ | 28.4 |
| Core particles 7 | 0.187 | 0.0241 | 7.8:1 | 1.33 | 43.6 | — | 9.1 × 10⁸ | 33.1 |
| Core particles 8 | 0.158 | 0.0212 | 7.5:1 | 1.43 | 53.5 | 8.8 | 4.2 × 10⁷ | 25.8 |
| Core particles 9 | 0.239 | 0.0271 | 8.8:1 | 1.36 | 85.8 | — | 9.3 × 10⁷ | 35.0 |
| Core particles 10 | 0.189 | 0.0220 | 8.6:1 | 1.41 | 111.3 | 7.6 | 4.8 × 10⁷ | 28.5 |

TABLE 4

Properties of carbon black fine particles

| Kind of carbon black fine particles | Particle shape | Average major axis diameter (μm) | Geometrical standard deviation (—) | BET specific surface area (m²/g) | Oil absorption (ml/100 g) | Blackness (L* value) (—) |
|---|---|---|---|---|---|---|
| Carbon black A | Granular | 0.022 | 1.78 | 133.5 | 84 | 14.6 |
| Carbon black B | Granular | 0.015 | 1.56 | 265.3 | 57 | 15.2 |
| Carbon black C | Granular | 0.030 | 2.06 | 84.6 | 95 | 17.0 |

TABLE 5

Production of non-magnetic acicular black iron-based composite particles

| Production Examples and Production Comparative Examples | Kind of core particles | Addition of alkoxysilane or silicon compound | | | | | Addition of carbon black fine particles Carbon black fine particles | | | | |
|---|---|---|---|---|---|---|---|---|---|---|---|
| | | Additives | | Amount added (part by weight) | Edge runner treatment | | Amount coated (calculated as Si) (wt. %) | Kind | Amount added (part by weight) | Edge runner treatment | | Amount adhered (calculated as C) (wt. %) |
| | | Kind | | | Linear load (Kg/cm) | Time (min) | | | | Linear load (Kg/cm) | Time (min) | |
| Production Example 1 | Core particles 1 | Methyl triethoxysilane | | 1.0 | 60 | 30 | 0.16 | A | 5.0 | 60 | 60 | 4.75 |
| Production Example 2 | Core particles 2 | Methyl trimethoxysilane | | 1.5 | 60 | 60 | 0.30 | A | 10.0 | 45 | 30 | 9.09 |
| Production Example 3 | Core particles 3 | Dimethyl dimethoxysilane | | 3.5 | 75 | 45 | 0.79 | B | 1.0 | 60 | 60 | 0.99 |
| Production Example 4 | Core particles 4 | Phenyl triethoxysilane | | 1.0 | 60 | 30 | 0.12 | B | 5.0 | 75 | 45 | 4.76 |
| Production Example 5 | Core particles 5 | Isobutyl trimethoxysilane | | 5.0 | 45 | 60 | 0.75 | C | 5.0 | 60 | 50 | 4.72 |
| Production Example 6 | Core particles 6 | Methyl triethoxysilane | | 2.0 | 60 | 45 | 0.31 | A | 5.0 | 45 | 60 | 4.75 |
| Production Example 7 | Core particles 7 | Methyl trimethoxysilane | | 1.0 | 50 | 30 | 0.20 | A | 10.0 | 60 | 45 | 9.01 |
| Production | Core | Dimethyl | | 2.0 | 60 | 60 | 0.46 | B | 1.0 | 75 | 60 | 0.99 |

TABLE 5-continued

Production of non-magnetic acicular black iron-based composite particles

| Production Examples and Production Comparative Examples | Kind of core particles | Addition of alkoxysilane or silicon compound | | | | | Addition of carbon black fine particles Carbon black fine particles | | | | |
|---|---|---|---|---|---|---|---|---|---|---|---|
| | | Additives | | Edge runner treatment | | Amount coated | | Amount added | Edge runner treatment | | Amount adhered |
| | | Kind | Amount added (part by weight) | Linear load (Kg/cm) | Time (min) | (calculated as Si) (wt. %) | Kind | (part by weight) | Linear load (Kg/cm) | Time (min) | (calculated as C) (wt. %) |
| Example 8 | particles 8 | dimethoxysilane | | | | | | | | | |
| Production Example 9 | Core particles 9 | Phenyl triethoxysilane | 4.5 | 75 | 30 | 0.50 | B | 5.0 | 60 | 30 | 4.81 |
| Production Example 10 | Core particles 10 | Isobutyl trimethoxysilane | 3.0 | 60 | 30 | 0.46 | C | 5.0 | 45 | 60 | 4.77 |
| Production Comparative Example 1 | Core particles 1 | — | — | — | — | — | A | 5.0 | 60 | 30 | 4.76 |
| Production Comparative Example 2 | Core particles 1 | Methyl triethoxysilane | 1.0 | 60 | 30 | 0.156 | — | — | — | — | — |
| Production Comparative Example 3 | Core particles 4 | Dimethyl dimethoxysilane | 0.5 | 60 | 60 | 0.116 | A | 0.01 | 45 | 60 | 0.009 |
| Production Comparative Example 4 | Core particles 4 | Methyl triethoxysilane | 0.005 | 60 | 30 | $7.9 \times 10^{-4}$ | B | 2.0 | 60 | 45 | 1.96 |
| Production Comparative Example 5 | Core particles 1 | -aminopropyl triethoxysilane | 1.0 | 60 | — | 0.126 | C | 5.0 | 45 | 60 | 4.78 |

TABLE 6

Properties of non-magnetic acicular black iron-based composite particles

| Production Examples and Production Comparative Examples | Average major axis diameter (μm) | Average minor axis diameter (μm) | Aspect ratio (-) | Geometrical standard deviation (-) | BET specific surface area (m²/g) | Mn content (wt. %) | Volume resistivity (Ω·cm) | Blackness (L* value) (-) | Carbon black desorption percentage (%) | Thickness of carbon black coat (μm) |
|---|---|---|---|---|---|---|---|---|---|---|
| Production Example 1 | 0.143 | 0.0211 | 6.8:1 | 1.37 | 55.6 | — | $3.6 \times 10^4$ | 19.6 | 7.1 | 0.0022 |
| Production Example 2 | 0.187 | 0.0242 | 7.7:1 | 1.34 | 46.8 | — | $8.6 \times 10^2$ | 18.3 | 6.6 | 0.0023 |
| Production Example 3 | 0.157 | 0.0211 | 7.4:1 | 1.43 | 54.1 | 8.2 | $9.6 \times 10^5$ | 18.1 | 8.3 | 0.0020 |
| Production Example 4 | 0.240 | 0.0273 | 8.8:1 | 1.35 | 88.1 | — | $5.8 \times 10^3$ | 20.3 | 9.1 | 0.0022 |
| Production Example 5 | 0.190 | 0.0221 | 8.6:1 | 1.42 | 115.6 | 6.9 | $8.6 \times 10^3$ | 18.9 | 6.8 | 0.0021 |
| Production Example 6 | 0.143 | 0.0212 | 6.7:1 | 1.37 | 55.3 | — | $5.8 \times 10^7$ | 19.8 | 4.8 | 0.0022 |
| Production Example 7 | 0.186 | 0.0243 | 7.7:1 | 1.34 | 47.2 | — | $1.1 \times 10^3$ | 17.9 | 4.7 | 0.0024 |
| Production Example 8 | 0.158 | 0.0212 | 7.5:1 | 1.43 | 53.9 | 8.0 | $3.6 \times 10^7$ | 18.3 | 4.5 | 0.0019 |
| Production Example 9 | 0.240 | 0.0273 | 8.8:1 | 1.36 | 86.9 | — | $1.8 \times 10^5$ | 19.3 | 3.2 | 0.0022 |
| Production Example 10 | 0.190 | 0.0222 | 8.6:1 | 1.41 | 113.1 | 7.1 | $5.1 \times 10^3$ | 19.1 | 2.9 | 0.0022 |
| Production Comparative Example 1 | 0.143 | 0.0211 | 6.8:1 | 1.38 | 59.0 | — | $1.6 \times 10^6$ | 23.8 | 63.2 | — |
| Production Comparative Example 2 | 0.143 | 0.0210 | 6.8:1 | 1.38 | 55.2 | — | $5.6 \times 10^7$ | 28.6 | — | — |
| Production Comparative Example 3 | 0.240 | 0.0272 | 8.8:1 | 1.37 | 88.1 | — | $8.4 \times 10^7$ | 33.3 | — | — |

TABLE 6-continued

| | | | | Properties of non-magnetic acicular black iron-based composite particles | | | | | |
|---|---|---|---|---|---|---|---|---|---|
| Production Examples and Production Comparative Examples | Average major axis diameter (μm) | Average minor axis diameter (μm) | Aspect ratio (—) | Geometrical standard deviation (—) | BET specific surface area (m²/g) | Mn content (wt. %) | Volume resistivity (Ω·cm) | Blackness (L* value) (—) | Carbon black desorption percentage (%) | Thickness of carbon black coat (μm) |
| Production Comparative Example 4 | 0.240 | 0.0273 | 8.8:1 | 1.36 | 89.8 | — | 9.6 × 10⁶ | 29.6 | 41.6 | — |
| Production Comparative Example 5 | 0.144 | 0.0212 | 6.8:1 | 1.37 | 56.7 | — | 4.1 × 10⁶ | 25.2 | 37.1 | — |

TABLE 7

| | | Production of non-magnetic coating composition | Properties of coating composition | Properties of non-magnetic undercoat layer | | | | | |
|---|---|---|---|---|---|---|---|---|---|
| Examples and Comparative Examples | Kind of non-magnetic particles | Weight ratio of particles to resin (—) | Viscosity (cP) | Thickness (μm) | Gloss (%) | Surface roughness Ra (nm) | Young's modulus (relative value) | Linear absorption (μm⁻¹) | Surface resistivity (Ω/sq) |
| Example 3 | Pro. Ex. 1 | 5.0 | 410 | 3.5 | 205 | 6.8 | 121 | 1.51 | 8.6 × 10⁹ |
| Example 4 | Pro. Ex. 2 | 5.0 | 384 | 3.4 | 198 | 7.2 | 125 | 1.58 | 4.6 × 10⁹ |
| Example 5 | Pro. Ex. 3 | 5.0 | 461 | 3.5 | 191 | 8.4 | 121 | 2.16 | 1.8 × 10⁹ |
| Example 6 | Pro. Ex. 4 | 5.0 | 1,305 | 3.5 | 186 | 9.0 | 128 | 1.46 | 2.1 × 10¹⁰ |
| Example 7 | Pro. Ex. 5 | 5.0 | 1,856 | 3.5 | 181 | 9.6 | 121 | 1.68 | 2.6 × 10⁹ |
| Example 8 | Pro. Ex. 6 | 5.0 | 358 | 3.4 | 211 | 6.2 | 122 | 1.64 | 7.6 × 10⁹ |
| Example 9 | Pro. Ex. 7 | 5.0 | 358 | 3.4 | 201 | 6.4 | 126 | 1.81 | 9.6 × 10⁹ |
| Example 10 | Pro. Ex. 8 | 5.0 | 435 | 3.5 | 195 | 7.8 | 123 | 2.36 | 6.3 × 10⁹ |
| Example 11 | Pro. Ex. 9 | 5.0 | 1,024 | 3.5 | 188 | 9.0 | 131 | 1.51 | 1.3 × 10¹⁰ |
| Example 12 | Pro. Ex. 10 | 5.0 | 1,536 | 3.5 | 185 | 9.2 | 123 | 1.46 | 9.4 × 10⁹ |
| Comparative Example 1 | Core particles 1 | 5.0 | 435 | 3.5 | 198 | 7.0 | 121 | 0.98 | 5.8 × 10¹³ |
| Comparative Example 2 | Core particles 2 | 5.0 | 310 | 3.4 | 193 | 8.2 | 123 | 1.01 | 1.1 × 10¹⁴ |
| Comparative Example 3 | Core particles 3 | 5.0 | 486 | 3.5 | 186 | 9.2 | 120 | 1.21 | 5.6 × 10¹² |
| Comparative Example 4 | Core particles 4 | 5.0 | 1,126 | 3.5 | 180 | 12.1 | 126 | 0.78 | 1.6 × 10¹³ |
| Comparative Example 5 | Core particles 5 | 5.0 | 2,355 | 3.6 | 171 | 14.2 | 121 | 1.18 | 2.3 × 10¹² |
| Comparative Example 6 | Carbon black A | 5.0 | 19,456 | 4.4 | 36 | 386 | 51 | — | — |
| Comparative Example 7 | Carbon black B | 5.0 | 25,600 | 5.6 | 18 | 582 | 36 | — | — |
| Comparative Example 8 | Carbon black C | 5.0 | 11,520 | 3.8 | 68 | 168 | 78 | — | — |
| Comparative Example 9 | Pro. Com. Ex. 1 | 5.0 | 1,203 | 3.6 | 118 | 63.5 | 111 | 1.28 | 5.8 1× 10¹¹ |
| Comparative Example 10 | Pro. Com. Ex. 2 | 5.0 | 384 | 3.5 | 186 | 8.8 | 121 | 0.92 | 7.8 × 10¹³ |
| Comparative Example 11 | Pro. Com. Ex. 3 | 5.0 | 1,306 | 3.5 | 178 | 11.2 | 119 | 0.98 | 9.6 × 10¹² |
| Comparative Example 12 | Pro. Com. Ex. 4 | 5.0 | 4,224 | 3.6 | 156 | 17.8 | 115 | 1.18 | 2.1 × 10¹¹ |
| Comparative Example 13 | Pro. Com. Ex. 5 | 5.0 | 1,638 | 3.7 | 136 | 25.6 | 116 | 1.28 | 1.8 × 10¹¹ |

TABLE 8

| Magnetic particles | Kind | Properties of magnetic particles ||||||| 
| | | Average major axis diameter (μm) | Average minor axis diameter (μm) | Aspect ratio (−) | Geometrical standard deviation (−) | Coercive force Hc (Oe) | Saturation magnetization (emu/g) | pH value (−) |
|---|---|---|---|---|---|---|---|---|
| Magnetic particles (1) | Magnetic metal particles containing iron as a main component | 0.127 | 0.0177 | 7.2:1 | 1.39 | 1,915 | 135.6 | 9.5 |
| Magnetic particles (2) | Magnetic metal particles containing iron as a main component | 0.105 | 0.0148 | 7.1:1 | 1.36 | 1,680 | 128.3 | 9.9 |
| Magnetic particles (3) | Co-coated magnetite particles (Co content: 4.82 wt %) | 0.151 | 0.0221 | 6.8:1 | 1.44 | 913 | 81.3 | 8.8 |
| Magnetic particles (4) | Co-coated magnetite particles (Co content: 4.82 wt %) | 0.211 | 0.0285 | 7.4:1 | 1.36 | 845 | 78.9 | 8.3 |

TABLE 9

| Examples | Kind of non-magnetic undercoat layer | Kind of magnetic particles | Weight ratio of particles to resin (−) | Thickness of magnetic coating film (μm) | Coercive force Hc (Oe) | Br/Bm (−) | Gloss (%) | Surface roughness Ra (μm) | Young's modulus (relative value) | Linear absorption ($\mu m^{-1}$) | Surface resistivity (Ω/sq) |
|---|---|---|---|---|---|---|---|---|---|---|---|
| Example 13 | Example 3 | Particles used in Example 2 | 5.0 | 1.1 | 1,970 | 0.87 | 226 | 6.2 | 125 | 1.86 | $3.2 \times 10^8$ |
| Example 14 | Example 4 | Magnetic particle (1) | 5.0 | 1.1 | 1,984 | 0.87 | 228 | 6.4 | 128 | 1.92 | $4.6 \times 10^8$ |
| Example 15 | Example 5 | Magnetic particles (1) | 5.0 | 1.0 | 1,978 | 0.86 | 216 | 7.2 | 124 | 2.46 | $1.9 \times 10^8$ |
| Example 16 | Example 6 | Magnetic particles (2) | 5.0 | 1.0 | 1,768 | 0.88 | 215 | 6.8 | 130 | 1.68 | $2.6 \times 10^9$ |
| Example 17 | Example 7 | Magnetic particles (2) | 5.0 | 1.1 | 1,770 | 0.87 | 209 | 7.4 | 126 | 2.01 | $8.9 \times 10^8$ |
| Example 18 | Example 8 | Particles used in Example 2 | 5.0 | 1.1 | 1,981 | 0.87 | 231 | 6.0 | 126 | 1.91 | $6.8 \times 10^8$ |
| Example 19 | Example 9 | Magnetic particles (1) | 5.0 | 1.1 | 1,992 | 0.87 | 226 | 6.4 | 131 | 2.12 | $3.6 \times 10^8$ |
| Example 20 | Example 10 | Magnetic particles (2) | 5.0 | 1.1 | 1,780 | 0.89 | 219 | 6.2 | 126 | 2.71 | $2.1 \times 10^8$ |
| Example 21 | Example 11 | Magnetic particles (3) | 5.0 | 1.0 | 978 | 0.90 | 192 | 7.2 | 136 | 1.83 | $4.6 \times 10^9$ |
| Example 22 | Example 12 | Magnetic particles (4) | 5.0 | 1.1 | 912 | 0.91 | 191 | 6.8 | 127 | 1.61 | $1.1 \times 10^9$ |

TABLE 10

Properties of magnetic recording medium

| Comparative Examples | Kind of non-magnetic undercoat layer | Kind of magnetic particles | Weight ratio of particles to resin (—) | Thickness of magnetic coating film (μm) | Coercive force Hc (Oe) | Br/Bm (—) | Gloss (%) | Surface roughness Ra (nm) | Young's modulus (relative value) | Linear absorption (μm$^{-1}$) | Surface resistivity (Ω/sq) |
|---|---|---|---|---|---|---|---|---|---|---|---|
| Comparative Example 14 | Comparative Example 1 | Particles used in Example 2 | 5.0 | 1.2 | 1,973 | 0.87 | 223 | 6.4 | 125 | 1.21 | 1.8 × 10$^{11}$ |
| Comparative Example 15 | Comparative Example 2 | Particles used in Example 2 | 5.0 | 1.2 | 1,971 | 0.87 | 221 | 6.6 | 127 | 1.22 | 8.6 × 10$^{11}$ |
| Comparative Example 16 | Comparative Example 3 | Particles used in Example 2 | 5.0 | 1.3 | 1,980 | 0.86 | 216 | 7.2 | 123 | 1.39 | 6.9 × 10$^{10}$ |
| Comparative Example 17 | Comparative Example 4 | Particles used in Example 2 | 5.0 | 1.1 | 1,972 | 0.84 | 208 | 11.6 | 128 | 1.08 | 4.6 × 10$^{11}$ |
| Comparative Example 18 | Comparative Example 5 | Particles used in Example 2 | 5.0 | 1.2 | 1,968 | 0.83 | 198 | 12.6 | 123 | 1.35 | 9.8 × 10$^{10}$ |
| Comparative Example 19 | Comparative Example 6 | Particles used in Example 2 | 5.0 | 1.3 | 1,931 | 0.76 | 82 | 128.0 | 61 | — | — |
| Comparative Example 20 | Comparative Example 7 | Particles used in Example 2 | 5.0 | 1.1 | 1,928 | 0.72 | 68 | 284.0 | 50 | — | — |
| Comparative Example 21 | Comparative Example 8 | Magnetic particles (1) | 5.0 | 1.3 | 1,951 | 0.79 | 93 | 84.1 | 121 | — | — |
| Comparative Example 22 | Comparative Example 9 | Magnetic particles (1) | 5.0 | 1.1 | 1,958 | 0.83 | 156 | 38.2 | 113 | 1.44 | 6.3 × 10$^{10}$ |
| Comparative Example 23 | Comparative Example 10 | Magnetic particles (1) | 5.0 | 1.0 | 1,976 | 0.87 | 196 | 7.6 | 125 | 1.20 | 7.1 × 10$^{10}$ |
| Comparative Example 24 | Comparative Example 11 | Magnetic particles (1) | 5.0 | 1.1 | 1,973 | 0.86 | 193 | 9.8 | 123 | 1.25 | 4.1 × 10$^{11}$ |
| Comparative Example 25 | Comparative Example 12 | Magnetic particles (1) | 5.0 | 1.1 | 1,968 | 0.84 | 165 | 14.4 | 119 | 1.39 | 9.6 × 10$^{10}$ |
| Comparative Example 26 | Comparative Example 13 | Magnetic particles (1) | 5.0 | 1.1 | 1,961 | 0.82 | 148 | 18.6 | 120 | 1.43 | 6.0 × 10$^{10}$ |

TABLE 11

Production of non-magnetic acicular black iron-based composite particles

| Production Examples and Production Comparative Examples | Kind of core particles | Addition of polysiloxane | | | | Addition of carbon black fine particles | | | | |
|---|---|---|---|---|---|---|---|---|---|---|
| | | Additives | | Edge runner treatment | | Amount coated (calculated as Si) (wt. %) | | Edge runner treatment | | Amount adhered (calculated as C) (wt. %) |
| | | Kind | Amount added (part by weight) | Linear load (Kg/cm) | Time (min) | | Kind | Amount added (part by weight) | Linear load (Kg/cm) | Time (min) | |
| Production Example 12 | Core particles 1 | TSF484 | 1.0 | 40 | 30 | 0.44 | A | 5.0 | 40 | 30 | 4.76 |
| Production Example 13 | Core particles 2 | TSF484 | 2.0 | 60 | 20 | 0.84 | A | 3.0 | 60 | 20 | 2.91 |

TABLE 11-continued

Production of non-magnetic acicular black iron-based composite particles

| Production Examples and Production Comparative Examples | Kind of core particles | Addition of polysiloxane | | | | | Addition of carbon black fine particles | | | | |
|---|---|---|---|---|---|---|---|---|---|---|---|
| | | Additives | | Edge runner | | Amount coated (calculated as Si) (wt. %) | | Edge runner | | Amount adhered (calculated as C) (wt. %) |
| | | Kind | Amount added (part by weight) | Linear load (Kg/cm) | Time (min) | | Kind | Amount added (part by weight) | Linear load (Kg/cm) | Time (min) | |
| Production Example 14 | Core particles 3 | KF99 | 3.0 | 20 | 30 | 1.23 | B | 10.0 | 20 | 30 | 9.11 |
| Production Example 15 | Core particles 4 | L-9000 | 5.0 | 60 | 20 | 2.01 | B | 7.5 | 35 | 40 | 7.00 |
| Production Example 16 | Core particles 5 | TSF484/ TSF451 | 1.0/ 2.0 | 40 | 30 | 1.23 | C | 5.0 | 45 | 20 | 4.81 |
| Production Example 17 | Core particles 6 | TSF484 | 1.5 | 35 | 30 | 0.63 | A | 5.0 | 75 | 20 | 4.78 |
| Production Example 18 | Core particles 7 | TSF484 | 2.5 | 75 | 20 | 1.00 | A | 2.0 | 60 | 30 | 1.97 |
| Production Example 19 | Core particles 8 | KF99 | 4.5 | 60 | 30 | 1.84 | B | 3.5 | 60 | 30 | 3.39 |
| Production Example 20 | Core particles 9 | L-9000 | 1.0 | 40 | 30 | 0.40 | B | 9.0 | 30 | 30 | 8.26 |
| Production Example 21 | Core particles 10 | TSF484/ TSF451 | 2.0/ 1.0 | 60 | 30 | 1.21 | C | 4.5 | 40 | 30 | 4.30 |
| Production Comparative Example 6 | Core particles 1 | TSF484 | 1.0 | 60 | 30 | 0.42 | — | — | 60 | 30 | — |
| Production Comparative Example 7 | Core particles 4 | TSF484 | 0.5 | 60 | 30 | 0.21 | A | 0.01 | 60 | 30 | 0.01 |
| Production Comparative Example 8 | Core particles 4 | TSF484 | 0.005 | 60 | 30 | $2.2 \times 10^{-3}$ | B | 3.0 | 60 | 30 | 2.91 |

TABLE 12

Properties of non-magnetic acicular black iron-based composite particles

| Production Examples and Production Comparative Examples | Average major axis diameter (μm) | Average minor axis diameter (μm) | Aspect ratio (—) | Geometrical standard deviation (—) | BET specific surface area (m²/g) | Mn content (wt. %) | Volume resistivity (Ω · cm) | Blackness (L* value) (—) | Carbon black desorption percentage (%) | Thickness of carbon black coat (μm) |
|---|---|---|---|---|---|---|---|---|---|---|
| Production Example 12 | 0.143 | 0.0210 | 6.8:1 | 1.37 | 54.8 | — | $1.8 \times 10^4$ | 18.9 | 6.8 | 0.0022 |
| Production Example 13 | 0.186 | 0.0242 | 7.7:1 | 1.34 | 47.2 | — | $7.2 \times 10^5$ | 19.3 | 8.9 | 0.0021 |
| Production Example 14 | 0.156 | 0.0210 | 7.4:1 | 1.43 | 54.3 | 8.1 | $3.2 \times 10^2$ | 17.6 | 5.6 | 0.0024 |
| Production Example 15 | 0.241 | 0.0272 | 8.9:1 | 1.36 | 89.1 | — | $2.6 \times 10^3$ | 19.6 | 8.3 | 0.0023 |
| Production Example 16 | 0.191 | 0.0221 | 8.6:1 | 1.41 | 116.8 | 6.9 | $4.3 \times 10^3$ | 18.1 | 5.6 | 0.0022 |
| Production Example 17 | 0.143 | 0.0211 | 6.8:1 | 1.37 | 54.6 | — | $2.9 \times 10^4$ | 18.9 | 4.6 | 0.0022 |
| Production Example 18 | 0.186 | 0.0242 | 7.7:1 | 1.34 | 47.3 | — | $3.6 \times 10^5$ | 19.7 | 4.2 | 0.0021 |
| Production Example 19 | 0.157 | 0.0211 | 7.4:1 | 1.43 | 54.1 | 8.0 | $3.1 \times 10^4$ | 18.1 | 3.8 | 0.0021 |

TABLE 12-continued

Properties of non-magnetic acicular black iron-based composite particles

| Production Examples and Production Comparative Examples | Average major axis diameter (μm) | Average minor axis diameter (μm) | Aspect ratio (-) | Geometrical standard deviation (-) | BET specific surface area (m²/g) | Mn content (wt. %) | Volume resistivity (Ω · cm) | Blackness (L* value) (-) | Carbon black desorption percentage (%) | Thickness of carbon black coat (μm) |
|---|---|---|---|---|---|---|---|---|---|---|
| Production Example 20 | 0.241 | 0.0272 | 8.9:1 | 1.36 | 87.3 | — | $4.8 \times 10^3$ | 17.3 | 3.2 | 0.0023 |
| Production Example 21 | 0.190 | 0.0222 | 8.6:1 | 1.41 | 113.6 | 7.1 | $5.6 \times 10^4$ | 18.6 | 2.9 | 0.0022 |
| Production Comparative Example 6 | 0.143 | 0.0211 | 6.8:1 | 1.37 | 55.0 | — | $4.1 \times 10^7$ | 28.5 | — | — |
| Production Comparative Example 7 | 0.240 | 0.0272 | 8.8:1 | 1.37 | 88.6 | — | $8.2 \times 10^7$ | 34.1 | — | — |
| Production Comparative Example 8 | 0.241 | 0.0273 | 8.8:1 | 1.36 | 89.0 | — | $7.6 \times 10^6$ | 30.3 | 43.2 | — |

TABLE 13

| Examples and Comparative Examples | Production of non-magnetic coating composition | | Properties of coating composition Viscosity (cP) | Properties of non-magnetic undercoat layer | | | | | |
|---|---|---|---|---|---|---|---|---|---|
| | Kind of non-magnetic particles | Weight ratio of particles to resin (-) | | Thickness (μm) | Gloss (%) | Surface roughness Ra (nm) | Young's modulus (relative value) | Linear absorption (μm⁻¹) | Surface resistivity (Ω/sq) |
| Example 23 | Production Example 11 | 5.0 | 410 | 3.5 | 198 | 6.8 | 128 | 1.82 | $2.1 \times 10^9$ |
| Example 24 | Production Example 12 | 5.0 | 358 | 3.5 | 194 | 7.2 | 123 | 1.59 | $8.6 \times 10^9$ |
| Example 25 | Production Example 13 | 5.0 | 435 | 3.4 | 193 | 7.3 | 126 | 1.50 | $4.6 \times 10^9$ |
| Example 26 | Production Example 14 | 5.0 | 410 | 3.5 | 186 | 8.8 | 123 | 2.38 | $1.8 \times 10^9$ |
| Example 27 | Production Example 15 | 5.0 | 461 | 3.5 | 191 | 7.4 | 127 | 1.81 | $8.9 \times 10^9$ |
| Example 28 | Production Example 16 | 5.0 | 512 | 3.4 | 189 | 7.8 | 122 | 1.53 | $2.6 \times 10^9$ |
| Example 29 | Production Example 17 | 5.0 | 333 | 3.6 | 196 | 6.9 | 123 | 1.53 | $7.6 \times 10^9$ |
| Example 30 | Production Example 18 | 5.0 | 281 | 3.5 | 198 | 6.8 | 125 | 1.46 | $9.6 \times 10^9$ |
| Example 31 | Production Example 19 | 5.0 | 384 | 3.5 | 195 | 6.9 | 124 | 1.53 | $6.3 \times 10^9$ |
| Example 32 | Production Example 20 | 5.0 | 410 | 3.6 | 202 | 6.2 | 129 | 2.16 | $9.2 \times 10^9$ |
| Example 33 | Production Example 21 | 5.0 | 333 | 3.5 | 206 | 6.0 | 124 | 1.51 | $9.4 \times 10^9$ |
| Comparative Example 27 | Production Comparative Example 6 | 5.0 | 358 | 3.5 | 179 | 9.8 | 120 | 0.91 | $6.7 \times 10^{13}$ |
| Comparative Example 28 | Production Comparative Example 7 | 5.0 | 1,024 | 3.6 | 173 | 12.3 | 118 | 0.97 | $5.6 \times 10^{12}$ |
| Comparative Example 29 | Production Comparative Example 8 | 5.0 | 3,840 | 3.7 | 153 | 21.6 | 116 | 1.18 | $2.0 \times 10^{11}$ |

TABLE 14

Production of magnetic recording medium

| Examples and Comparative Examples | Kind of non-magnetic undercoat layer | Kind of magnetic particles | Weight ratio of particles to resin (-) | Thickness of magnetic coating film ($\mu$m) | Coercive force Hc (Oe) | Br/Bm (-) | Gloss (%) | Surface roughness Ra (nm) | Young's modulus (relative value) | Linear absorption ($\mu m^{-1}$) | Surface resistivity ($\Omega$/sq) |
|---|---|---|---|---|---|---|---|---|---|---|---|
| Example 34 | Example 23 | Particles used in Example 2 | 5.0 | 1.0 | 1,971 | 0.88 | 229 | 6.0 | 127 | 1.86 | $5.6 \times 10^8$ |
| Example 35 | Example 24 | Particles used in Example 2 | 5.0 | 1.1 | 1,968 | 0.87 | 228 | 6.0 | 126 | 1.89 | $2.6 \times 10^8$ |
| Example 36 | Example 25 | Magnetic particles (1) | 5.0 | 1.0 | 1,983 | 0.87 | 226 | 6.2 | 128 | 1.87 | $3.8 \times 10^8$ |
| Example 37 | Example 26 | Magnetic particles (1) | 5.0 | 1.1 | 1,975 | 0.86 | 210 | 7.4 | 125 | 2.53 | $2.5 \times 10^8$ |
| Example 38 | Example 27 | Magnetic particles (2) | 5.0 | 1.0 | 1,769 | 0.87 | 218 | 6.9 | 131 | 1.71 | $3.1 \times 10^9$ |
| Example 39 | Example 28 | Magnetic particles (2) | 5.0 | 1.1 | 1,773 | 0.87 | 211 | 7.1 | 126 | 1.96 | $8.6 \times 10^8$ |
| Example 40 | Example 29 | Particles used in Example 2 | 5.0 | 1.1 | 1,976 | 0.88 | 228 | 6.5 | 127 | 1.93 | $8.6 \times 10^8$ |
| Example 41 | Example 30 | Magnetic particles (1) | 5.0 | 1.0 | 1,988 | 0.88 | 223 | 6.0 | 130 | 1.88 | $3.2 \times 10^8$ |
| Example 42 | Example 31 | Magnetic particles (2) | 5.0 | 1.0 | 1,783 | 0.89 | 213 | 6.8 | 127 | 1.94 | $2.6 \times 10^8$ |
| Example 43 | Example 32 | Magnetic particles (3) | 5.0 | 1.1 | 976 | 0.90 | 195 | 7.7 | 134 | 2.38 | $5.1 \times 10^9$ |
| Example 44 | Example 33 | Magnetic particles (4) | 5.0 | 1.0 | 920 | 0.90 | 199 | 7.0 | 128 | 1.63 | $1.3 \times 10^9$ |
| Comparative Example 30 | Comparative Example 27 | Magnetic particles (1) | 5.0 | 1.0 | 1,974 | 0.86 | 193 | 8.1 | 123 | 1.18 | $8.1 \times 10^{10}$ |
| Comparative Example 31 | Comparative Example 28 | Magnetic particles (1) | 5.0 | 1.1 | 1,974 | 0.85 | 191 | 10.0 | 121 | 1.25 | $3.6 \times 10^{11}$ |
| Comparative Example 32 | Comparative Example 29 | Magnetic particles (1) | 5.0 | 1.1 | 1,970 | 0.84 | 168 | 15.6 | 118 | 1.38 | $8.8 \times 10^{10}$ |

TABLE 15

Production of non-magnetic acicular black iron-based composite particles

| Production Examples and Production Comparative Examples | Kind of core particles | Addition of modified polysiloxane | | | | Addition of carbon black fine particles | | | | |
|---|---|---|---|---|---|---|---|---|---|---|
| | | Additives | | Edge runner treatment | | Amount coated | Carbon black fine particles | | Edge runner treatment | Amount adhered |
| | | Kind | Amount added (part by weight) | Linear load (Kg/cm) | Time (min) | (calculated as Si) (wt. %) | Kind | Amount added (part by weight) | Linear load (Kg/cm) | Time (min) | (calculated as C) (wt. %) |
| Production Example 23 | Core particles 1 | BYK-080 | 1.0 | 40 | 30 | 0.18 | A | 9.0 | 60 | 30 | 8.35 |
| Production Example 24 | Core particles 2 | BYK-080 | 1.0 | 45 | 40 | 0.17 | A | 5.0 | 40 | 30 | 4.75 |
| Production Example 25 | Core particles 3 | BYK-322 | 2.0 | 60 | 20 | 0.35 | B | 7.0 | 40 | 20 | 6.53 |

TABLE 15-continued

Production of non-magnetic acicular black iron-based composite particles

| Production Examples and Production Comparative Examples | Kind of core particles | Addition of modified polysiloxane | | | | | Addition of carbon black fine particles Carbon black fine particles | | | | |
|---|---|---|---|---|---|---|---|---|---|---|---|
| | | Additives Kind | Amount added (part by weight) | Edge runner treatment Linear load (Kg/cm) | Time (min) | Amount coated (calculated as Si) (wt. %) | Kind | Amount added (part by weight) | Edge runner treatment Linear load (Kg/cm) | Time (min) | Amount adhered (calculated as C) (wt. %) |
| Production Example 26 | Core particles 4 | TSF4446 | 1.0 | 30 | 30 | 0.17 | B | 10.0 | 35 | 20 | 9.11 |
| Production Example 27 | Core particles 5 | TSF4460 | 3.0 | 70 | 30 | 0.50 | C | 10.0 | 35 | 30 | 9.09 |
| Production Example 28 | Core particles 6 | BYK-080 | 0.5 | 45 | 20 | 0.09 | A | 7.5 | 30 | 20 | 6.98 |
| Production Example 29 | Core particles 7 | BYK-310 | 1.5 | 30 | 20 | 0.25 | A | 10.0 | 30 | 20 | 9.09 |
| Production Example 30 | Core particles 8 | BYK-322 | 2.5 | 60 | 30 | 0.43 | B | 5.0 | 40 | 30 | 4.77 |
| Production Example 31 | Core particles 9 | TSF4446 | 1.0 | 40 | 30 | 0.17 | B | 3.0 | 45 | 45 | 2.92 |
| Production Example 32 | Core particles 10 | TSF4460 | 1.0 | 60 | 40 | 0.16 | C | 5.0 | 60 | 30 | 4.73 |
| Production Comparative Example 9 | Core particles 1 | BYK-080 | 1.0 | 60 | 30 | 0.17 | — | — | — | — | — |
| Production Comparative Example 10 | Core particles 4 | BYK-080 | 0.5 | 60 | 30 | 0.08 | A | 0.01 | 60 | 30 | 0.01 |
| Production Comparative Example 11 | Core particles 4 | BYK-080 | 0.005 | 60 | 30 | $9.0 \times 10^{-4}$ | B | 5.0 | 60 | 30 | 4.76 |

TABLE 16

| Production Examples and Production Comparative Examples | Properties of non-magnetic acicular black iron-based composite particles | | | | | | Properties of black iron-based composite particles | | | Thickness of carbon black coat ($\mu$m) |
|---|---|---|---|---|---|---|---|---|---|---|
| | Average major axis diameter ($\mu$m) | Average minor axis diameter ($\mu$m) | Aspect ratio (-) | Geometrical standard deviation (-) | BET specific surface area (m²/g) | Mn content (wt. %) | Volume resitivity ($\Omega \cdot$ cm) | Blackness (L* value) (-) | Carbon black desorption percentage (%) | |
| Production Example 23 | 0.143 | 0.0211 | 6.8:1 | 1.36 | 55.4 | — | $2.6 \times 10^3$ | 17.9 | 5.9 | 0.0023 |
| Production Example 24 | 0.187 | 0.0241 | 7.8:1 | 1.34 | 46.9 | — | $3.2 \times 10^4$ | 18.9 | 6.3 | 0.0022 |
| Production Example 25 | 0.156 | 0.0211 | 7.4:1 | 1.43 | 54.2 | 8.2 | $9.6 \times 10^3$ | 18.6 | 7.3 | 0.0022 |
| Production Example 26 | 0.241 | 0.0272 | 8.9:1 | 1.35 | 88.3 | — | $5.4 \times 10^3$ | 17.6 | 6.9 | 0.0023 |
| Production Example 27 | 0.191 | 0.0221 | 8.6:1 | 1.42 | 115.8 | 6.9 | $1.6 \times 10^3$ | 17.3 | 8.3 | 0.0024 |
| Production Example 28 | 0.143 | 0.0213 | 6.7:1 | 1.36 | 55.8 | — | $1.6 \times 10^3$ | 18.1 | 4.1 | 0.0024 |
| Production Example 29 | 0.186 | 0.0243 | 7.7:1 | 1.34 | 47.3 | — | $4.1 \times 10^3$ | 17.8 | 3.6 | 0.0024 |
| Production Example 30 | 0.158 | 0.0212 | 7.5:1 | 1.43 | 54.1 | 8.0 | $4.8 \times 10^4$ | 18.6 | 4.8 | 0.0022 |
| Production Example 31 | 0.241 | 0.0273 | 8.8:1 | 1.35 | 86.3 | — | $1.0 \times 10^5$ | 19.5 | 3.2 | 0.0021 |
| Production Example 32 | 0.191 | 0.0221 | 8.6:1 | 1.41 | 112.8 | 7.1 | $3.6 \times 10^4$ | 18.6 | 2.6 | 0.0022 |
| Production Comparative Example 9 | 0.143 | 0.0210 | 6.8:1 | 1.38 | 54.6 | — | $6.1 \times 10^7$ | 27.3 | — | — |
| Production Comparative Example 10 | 0.240 | 0.0271 | 8.9:1 | 1.38 | 87.9 | — | $7.6 \times 10^7$ | 32.9 | — | — |

TABLE 16-continued

| | Properties of non-magnetic acicular black iron-based composite particles | | | | Properties of black iron-based composite particles | | | | | Thickness of carbon black coat ($\mu$m) |
|---|---|---|---|---|---|---|---|---|---|---|
| Production Examples and Production Comparative Examples | Average major axis diameter ($\mu$m) | Average minor axis diameter ($\mu$m) | Aspect ratio (–) | Geometrical standard deviation (–) | BET specific surface area (m²/g) | Mn content (wt. %) | Volume resitivity ($\Omega \cdot$ cm) | Blackness (L* value) (–) | Carbon black desorption percentage (%) | |
| Production Comparative Example 11 | 0.241 | 0.0273 | 8.8:1 | 1.36 | 88.9 | — | $8.1 \times 10^6$ | 30.1 | 51.3 | — |

TABLE 17

| Examples and Comparative Examples | Production of non-magnetic coating composition | | Properties of coating composition Viscosity (cP) | Properties of non-magnetic undercoat layer | | | | | |
|---|---|---|---|---|---|---|---|---|---|
| | Kind of non-magnetic particles | Weight ratio of particles to resin (–) | | Thickness ($\mu$m) | Gloss (%) | Surface roughness Ra (nm) | Young's modulus (relative value) | Linear absorption ($\mu$m$^{-1}$) | Surface resistivity ($\Omega$/sq) |
| Example 45 | Production Example 22 | 5.0 | 384 | 3.5 | 196 | 6.8 | 128 | 1.84 | $1.8 \times 10^9$ |
| Example 46 | Production Example 23 | 5.0 | 410 | 3.5 | 191 | 7.1 | 123 | 2.20 | $3.4 \times 10^9$ |
| Example 47 | Production Example 24 | 5.0 | 333 | 3.4 | 193 | 6.9 | 125 | 1.61 | $5.1 \times 10^9$ |
| Example 48 | Production Example 25 | 5.0 | 435 | 3.5 | 190 | 7.2 | 123 | 1.76 | $8.1 \times 10^9$ |
| Example 49 | Production Example 26 | 5.0 | 461 | 3.5 | 186 | 7.8 | 127 | 2.31 | $1.0 \times 10^9$ |
| Example 50 | Production Example 27 | 5.0 | 358 | 3.5 | 186 | 7.9 | 123 | 2.33 | $1.1 \times 10^9$ |
| Example 51 | Production Example 28 | 5.0 | 310 | 3.6 | 196 | 6.8 | 123 | 1.86 | $3.1 \times 10^9$ |
| Example 52 | Production Example 29 | 5.0 | 410 | 3.5 | 196 | 6.8 | 125 | 2.30 | $1.2 \times 10^9$ |
| Example 53 | Production Example 30 | 5.0 | 384 | 3.5 | 203 | 6.3 | 125 | 1.58 | $6.8 \times 10^9$ |
| Example 54 | Production Example 31 | 5.0 | 333 | 3.6 | 205 | 6.3 | 129 | 1.43 | $2.1 \times 10^{10}$ |
| Example 55 | Production Example 32 | 5.0 | 310 | 3.5 | 198 | 6.8 | 125 | 1.57 | $4.6 \times 10^9$ |
| Comparative Example 33 | Production Comparative Example 9 | 5.0 | 410 | 3.5 | 176 | 10.0 | 121 | 0.93 | $6.3 \times 10^{13}$ |
| Comparative Example 34 | Production Comparative Example 10 | 5.0 | 1,280 | 3.7 | 173 | 14.4 | 117 | 1.01 | $8.7 \times 10^{12}$ |
| Comparative Example 35 | Production Comparative Example 11 | 5.0 | 3,584 | 3.7 | 151 | 25.6 | 113 | 1.19 | $1.6 \times 10^{11}$ |

TABLE 18

Production of magnetic recording medium

| Examples and Comparative Examples | Kind of non-magnetic undercoat layer | Kind of magnetics particles | Weight ratio of particles to resin (-) |
|---|---|---|---|
| Example 56 | Example 45 | Particles used in Example 2 | 5.0 |
| Example 57 | Example 46 | Particles used in Example 2 | 5.0 |
| Example 58 | Example 47 | Magnetic particles (1) | 5.0 |
| Example 59 | Example 48 | Magnetic particles (1) | 5.0 |
| Example 60 | Example 49 | Magnetic particles (2) | 5.0 |
| Example 61 | Example 50 | Magnetic particles (2) | 5.0 |
| Example 62 | Example 51 | Particles used in Example 2 | 5.0 |
| Example 63 | Example 52 | Magnetic particles (1) | 5.0 |
| Example 64 | Example 53 | Magnetic particles (2) | 5.0 |
| Example 65 | Example 54 | Magnetic particles (3) | 5.0 |
| Example 66 | Example 55 | Magnetic particles (4) | 5.0 |
| Comparative Example 36 | Comparative Example 33 | Magnetic particles (1) | 5.0 |
| Comparative Example 37 | Comparative Example 34 | Magnetic particles (1) | 5.0 |
| Comparative Example 38 | Comparative Example 35 | Magnetic particles (1) | 5.0 |

Properties of magnetic recording medium

| Examples and Comparative Examples | Thickness of magnetic layer ($\mu$m) | Coercive force Hc (Oe) | Br/Bm (-) | Gloss (%) |
|---|---|---|---|---|
| Example 56 | 1.0 | 1,979 | 0.88 | 226 |
| Example 57 | 1.1 | 1,960 | 0.87 | 223 |
| Example 58 | 1.0 | 1,980 | 0.87 | 223 |
| Example 59 | 1.0 | 1,973 | 0.87 | 215 |
| Example 60 | 1.1 | 1,769 | 0.87 | 210 |
| Example 61 | 1.1 | 1,768 | 0.88 | 212 |
| Example 62 | 1.0 | 1,983 | 0.88 | 228 |
| Example 63 | 1.1 | 1,989 | 0.87 | 227 |
| Example 64 | 1.0 | 1,783 | 0.89 | 218 |
| Example 65 | 1.0 | 972 | 0.89 | 190 |
| Example 66 | 1.0 | 915 | 0.90 | 190 |
| Comparative Example 36 | 1.0 | 1,971 | 0.86 | 189 |
| Comparative Example 37 | 1.0 | 1,972 | 0.85 | 181 |
| Comparative Example 38 | 1.1 | 1,971 | 0.83 | 159 |

Properties of magnetic recording medium

| Examples and Comparative Examples | Surface roughness Ra (nm) | Young's modulus (relative value) | Linear absorption ($\mu$m$^{-1}$) | Surface resistivity ($\Omega$/sq) |
|---|---|---|---|---|
| Example 56 | 6.2 | 128 | 1.87 | $4.8 \times 10^8$ |
| Example 57 | 6.0 | 124 | 2.26 | $4.0 \times 10^8$ |
| Example 58 | 6.0 | 127 | 1.68 | $8.2 \times 10^8$ |
| Example 59 | 6.4 | 124 | 2.01 | $6.0 \times 10^8$ |
| Example 60 | 6.6 | 129 | 2.46 | $2.3 \times 10^9$ |
| Example 61 | 6.4 | 125 | 2.48 | $2.1 \times 10^8$ |
| Example 62 | 6.2 | 125 | 1.96 | $5.1 \times 10^8$ |
| Example 63 | 6.2 | 130 | 2.61 | $1.2 \times 10^8$ |
| Example 64 | 6.6 | 126 | 1.63 | $7.3 \times 10^8$ |
| Example 65 | 6.8 | 134 | 1.46 | $1.6 \times 10^9$ |
| Example 66 | 7.0 | 126 | 1.66 | $8.1 \times 10^9$ |
| Comparative Example 36 | 8.2 | 121 | 1.20 | $9.6 \times 10^{10}$ |
| Comparative Example 37 | 10.1 | 121 | 1.26 | $5.3 \times 10^{11}$ |
| Comparative Example 38 | 17.6 | 118 | 1.37 | $8.2 \times 10^{10}$ |

TABLE 19

Production of non-magnetic acicular black iron-based composite particles

Addition of terminal-modified polysiloxane

| Production Examples and Production Comparative Examples | Kind of core particles | Additives Kind | Amount added (part by weight) |
|---|---|---|---|
| Production Example 34 | Core particles 1 | TSF4770 | 2.0 |
| Production Example 35 | Core particles 2 | TSF4751 | 0.5 |
| Production Example 36 | Core particles 3 | XF3905 | 5.0 |
| Production Example 37 | Core particles 4 | YF3804 | 2.0 |
| Production Example 38 | Core particles 5 | TSF4770 | 1.0 |
| Production Example 39 | Core particles 6 | TSF4770 | 1.0 |
| Production Example 40 | Core particles 7 | TSF4751 | 0.5 |
| Production Example 41 | Core particles 8 | XF3905 | 2.0 |
| Production Example 42 | Core particles 9 | YF3804 | 1.5 |
| Production Example 43 | Core particles 10 | TSF4770 | 3.0 |
| Production Comparative Example 12 | Core particles 1 | TSF4770 | 1.0 |
| Production Comparative Example 13 | Core particles 4 | TSF4770 | 1.0 |
| Production Comparative Example 14 | Core particles 4 | TSF4770 | 0.005 |

Production of non-magnetic acicular black iron-based composite particles

Addition of terminal-modified polysiloxane

| Examples and Comparative Examples | Edge runner treatment Linear load (kg/cm) | Time (min) | Amount coated (calculated as Si) (wt. %) |
|---|---|---|---|
| Production Example 34 | 30 | 30 | 0.45 |

TABLE 19-continued

| | | | |
|---|---|---|---|
| Production Example 35 | 60 | 20 | 0.12 |
| Production Example 36 | 40 | 40 | 1.10 |
| Production Example 37 | 30 | 40 | 0.44 |
| Production Example 38 | 50 | 30 | 0.23 |
| Production Example 39 | 70 | 20 | 0.21 |
| Production Example 40 | 60 | 30 | 0.13 |
| Production Example 41 | 55 | 30 | 0.46 |
| Production Example 42 | 35 | 30 | 0.36 |
| Production Example 43 | 45 | 20 | 0.65 |
| Production Comparative Example 12 | 60 | 30 | 0.25 |
| Production Comparative Example 13 | 60 | 30 | 0.25 |
| Production Comparative Example 14 | 60 | 30 | $1.3 \times 10^{-3}$ |

| | Production of non-magnetic acicular black iron-based composite particles | |
|---|---|---|
| Production Examples and Production Comparative Examples | Addition of carbon black fine particles | |
| | Carbon black fine particles | |
| | Kind | Amount added (part by weight) |
| Production Example 34 | A | 11.0 |
| Production Example 35 | A | 5.0 |
| Production Example 36 | B | 7.5 |
| Production Example 37 | B | 10.0 |
| Production Example 38 | C | 15.0 |
| Production Example 39 | A | 10.0 |
| Production Example 40 | A | 10.0 |
| Production Example 41 | B | 7.5 |
| Production Example 42 | B | 12.0 |
| Production Example 43 | C | 15.0 |
| Production Comparative Example 12 | — | — |
| Production Comparative Example 13 | A | 0.01 |
| Production Comparative Example 14 | B | 5.0 |

TABLE 19-continued

| | Production of non-magnetic acicular black iron-based composite particles | | |
|---|---|---|---|
| Production | Addition of carbon black fine particles | | |
| Examples and Production | Edge runner treatment | | Amount adhered (calculated |
| Comparative Examples | Linear load (Kg/cm) | Time (min) | as C) (wt. %) |
| Production Example 34 | 30 | 30 | 9.92 |
| Production Example 35 | 45 | 60 | 4.77 |
| Production Example 36 | 40 | 35 | 6.98 |
| Production Example 37 | 55 | 60 | 9.10 |
| Production Example 38 | 50 | 40 | 13.21 |
| Production Example 39 | 70 | 50 | 9.08 |
| Production Example 40 | 60 | 45 | 9.10 |
| Production Example 41 | 30 | 40 | 7.03 |
| Production Example 42 | 35 | 50 | 10.71 |
| Production Example 43 | 40 | 30 | 13.46 |
| Production Comparative Example 12 | — | — | — |
| Production Comparative Example 13 | 60 | 30 | 0.01 |
| Production Comparative Example 14 | 60 | 30 | 4.71 |

TABLE 20

| | Properties of non-magnetic acicular black iron-based composite particles | | | |
|---|---|---|---|---|
| Production Examples and Production Comparative Examples | Average major axis diameter (μm) | Average minor axis diameter (μM) | Aspect ratio (—) | Geometrical standard deviation (—) |
| Production Example 34 | 0.143 | 0.0212 | 6.7:1 | 1.36 |
| Production Example 35 | 0.186 | 0.0242 | 7.7:1 | 1.34 |
| Production Example 36 | 0.158 | 0.0212 | 7.5:1 | 1.43 |
| Production Example 37 | 0.240 | 0.0273 | 8.8:1 | 1.35 |
| Production Example 38 | 0.191 | 0.0221 | 8.6:1 | 1.42 |
| Production Example 39 | 0.144 | 0.0212 | 6.8:1 | 1.37 |
| Production Example 40 | 0.186 | 0.0242 | 7.7:1 | 1.35 |
| Production Example 41 | 0.159 | 0.0212 | 7.5:1 | 1.43 |
| Production Example 42 | 0.241 | 0.0273 | 8.8:1 | 1.36 |
| Production Example 43 | 0.190 | 0.0222 | 8.6:1 | 1.41 |
| Production Comparative Example 12 | 0.143 | 0.0210 | 6.8:1 | 1.38 |

TABLE 20-continued

| | | | | |
|---|---|---|---|---|
| Production Comparative Example 13 | 0.240 | 0.0272 | 8.8:1 | 1.38 |
| Production Comparative Example 14 | 0.240 | 0.0272 | 8.8:1 | 1.37 |

| Production Examples and Production Comparative Examples | Properties of non-magnetic acicular black iron-based composite particles | | |
|---|---|---|---|
| | BET specific surface area (m²/g) | Mn content (wt. %) | Volume resistivity (Ω · cm) |
| Production Example 34 | 55.8 | — | $2.1 \times 10^3$ |
| Production Example 35 | 47.1 | — | $3.8 \times 10^4$ |
| Production Example 36 | 55.1 | 8.2 | $9.6 \times 10^3$ |
| Production Example 37 | 89.3 | — | $4.1 \times 10^3$ |
| Production Example 38 | 116.0 | 6.8 | $7.2 \times 10^2$ |
| Production Example 39 | 55.6 | — | $6.1 \times 10^3$ |
| Production Example 40 | 48.3 | — | $7.1 \times 10^3$ |
| Production Example 41 | 53.8 | 7.9 | $6.9 \times 10^4$ |
| Production Example 42 | 88.8 | — | $3.9 \times 10^3$ |
| Production Example 43 | 113.6 | 7.0 | $2.9 \times 10^3$ |
| Production Comparative Example 12 | 55.1 | — | $5.1 \times 10^7$ |
| Production Comparative Example 13 | 88.2 | — | $8.6 \times 10^7$ |
| Production Comparative Example 14 | 89.6 | — | $8.8 \times 10^6$ |

| Production Examples and Production Comparative Examples | Properties of non-magnetic acicular black iron-based composite particles | | |
|---|---|---|---|
| | Blackness (L* value) (—) | Carbon black desorption percentage (%) | Thickness of carbon black coat (μm) |
| Production Example 34 | 17.3 | 8.8 | 0.0024 |
| Production Example 35 | 18.6 | 6.1 | 0.0022 |
| Production Example 36 | 17.6 | 7.3 | 0.0023 |
| Production Example 37 | 17.3 | 8.3 | 0.0023 |
| Production Example 38 | 16.9 | 9.6 | 0.0025 |
| Production Example 39 | 17.3 | 4.6 | 0.0023 |
| Production Example 40 | 17.5 | 4.6 | 0.0024 |
| Production Example 41 | 17.9 | 3.6 | 0.0023 |
| Production Example 42 | 17.1 | 3.8 | 0.0024 |
| Production Example 43 | 16.5 | 4.3 | 0.0025 |
| Production Comparative Example 12 | 28.6 | — | — |
| Production Comparative Example 13 | 33.2 | — | — |
| Production Comparative Example 14 | 29.5 | 48.3 | — |

TABLE 21

| Examples and Comparative Examples | Production of non-magnetic coating composition | | Properties of coating composition Viscosity (cP) |
|---|---|---|---|
| | Kind of non-magnetic particles | Weight ratio of particles to resin (—) | |
| Example 67 | Production Example 33 | 5.0 | 310 |
| Example 68 | Production Example 34 | 5.0 | 358 |
| Example 69 | Production Example 35 | 5.0 | 333 |
| Example 70 | Production Example 36 | 5.0 | 410 |
| Example 71 | Production Example 37 | 5.0 | 435 |
| Example 72 | Production Example 38 | 5.0 | 333 |
| Example 73 | Production Example 39 | 5.0 | 384 |
| Example 74 | Production Example 40 | 5.0 | 410 |
| Example 75 | Production Example 41 | 5.0 | 310 |
| Example 76 | Production Example 42 | 5.0 | 410 |
| Example 77 | Production Example 43 | 5.0 | 333 |
| Comparative Example 39 | Production Comparative Example 12 | 5.0 | 435 |
| Comparative Example 40 | Production Comparative Example 13 | 5.0 | 1,254 |
| Comparative Example 41 | Production Comparative Example 14 | 5.0 | 4,096 |

| Examples and Comparative Examples | Properties of non-magnetic undercoat layer | | | |
|---|---|---|---|---|
| | Thickness (μm) | Gloss (%) | Surface roughness Ra (nm) | Young's modulus (relative value) |
| Example 67 | 3.5 | 196 | 6.5 | 128 |
| Example 68 | 3.5 | 193 | 6.9 | 123 |
| Example 69 | 3.4 | 196 | 6.7 | 125 |
| Example 70 | 3.5 | 191 | 7.3 | 124 |
| Example 71 | 3.5 | 190 | 7.4 | 128 |
| Example 72 | 3.5 | 193 | 6.8 | 123 |
| Example 73 | 3.6 | 196 | 6.6 | 124 |
| Example 74 | 3.5 | 198 | 6.5 | 126 |
| Example 75 | 3.4 | 201 | 6.3 | 125 |
| Example 76 | 3.5 | 205 | 6.0 | 128 |
| Example 77 | 3.6 | 198 | 6.3 | 125 |
| Comparative Example 39 | 3.5 | 180 | 10.8 | 121 |

TABLE 21-continued

| | | | | |
|---|---|---|---|---|
| Comparative Example 40 | 3.5 | 176 | 14.0 | 116 |
| Comparative Example 41 | 3.5 | 153 | 21.6 | 111 |

| Examples and Comparative Examples | Properties of non-magnetic undercoat layer | |
|---|---|---|
| | Linear absorption ($\mu m^{-1}$) | Surface resistivity ($\Omega$/sq) |
| Example 67 | 1.87 | $2.3 \times 10^9$ |
| Example 68 | 2.48 | $2.6 \times 10^9$ |
| Example 69 | 1.65 | $6.8 \times 10^9$ |
| Example 70 | 1.93 | $2.2 \times 10^9$ |
| Example 71 | 2.26 | $1.6 \times 10^9$ |
| Example 72 | 2.66 | $8.1 \times 10^8$ |
| Example 73 | 2.38 | $1.3 \times 10^9$ |
| Example 74 | 2.41 | $9.8 \times 10^8$ |
| Example 75 | 2.29 | $5.2 \times 10^9$ |
| Example 76 | 2.46 | $8.6 \times 10^8$ |
| Example 77 | 2.68 | $2.6 \times 10^8$ |
| Comparative Example 39 | 0.91 | $8.7 \times 10^{13}$ |
| Comparative Example 40 | 0.96 | $8.8 \times 10^{12}$ |
| Comparative Example 41 | 1.17 | $3.1 \times 10^{11}$ |

TABLE 22

| Examples and Comparative Examples | Production of magnetic recording medium | | |
|---|---|---|---|
| | Kind of non-magnetic undercoat layer | Kind of magnetic particles | Weight ratio of particles (-) |
| Example 78 | Example 67 | Particles used in Example 2 | 5.0 |
| Example 79 | Example 68 | Particles used in Example 2 | 5.0 |
| Example 80 | Example 69 | Magnetic particles (1) | 5.0 |
| Example 81 | Example 70 | Magnetic particles (1) | 5.0 |
| Example 82 | Example 71 | Magnetic particles (2) | 5.0 |
| Example 83 | Example 72 | Magnetic particles (2) | 5.0 |
| Example 84 | Example 73 | Particles used in Example 2 | 5.0 |
| Example 85 | Example 74 | Magnetic particles(1) | 5.0 |
| Example 86 | Example 75 | Magnetic particles (2) | 5.0 |
| Example 87 | Example 76 | Magnetic particles (3) | 5.0 |
| Example 88 | Example 77 | Magnetic particles (4) | 5.0 |
| Comparative Example 42 | Comparative Example 39 | Magnetic particles (1) | 5.0 |
| Comparative Example 43 | Comparative Example 40 | Magnetic particles (1) | 5.0 |
| Comparative Example 44 | Comparative Example 41 | Magnetic particles (1) | 5.0 |

| Examples and Comparative Examples | Properties of magnetic recording medium | | | |
|---|---|---|---|---|
| | Thickness of magnetic coating film ($\mu$m) | Coercive force Hc (Oe) | Br/Bm (-) | Gloss (%) |
| Example 78 | 1.0 | 1,978 | 0.88 | 226 |
| Example 79 | 1.1 | 1,968 | 0.87 | 227 |
| Example 80 | 1.1 | 1,981 | 0.88 | 230 |
| Example 81 | 1.1 | 1,986 | 0.87 | 218 |
| Example 82 | 1.0 | 1,773 | 0.87 | 218 |
| Example 83 | 1.1 | 1,768 | 0.87 | 210 |
| Example 84 | 1.0 | 1,983 | 0.87 | 213 |
| Example 85 | 1.1 | 1,983 | 0.88 | 213 |
| Example 86 | 1.1 | 1,782 | 0.88 | 216 |
| Example 87 | 1.1 | 973 | 0.90 | 193 |
| Example 88 | 1,1 | 915 | 0.90 | 190 |
| Comparative Example 42 | 1.0 | 1,977 | 0.86 | 188 |
| Comparative Example 43 | 1.1 | 1,972 | 0.86 | 186 |
| Comparative Example 44 | 1.2 | 1,970 | 0.84 | 161 |

| Examples and Comparative Examples | Properties of magnetic recording medium | | | |
|---|---|---|---|---|
| | Surface roughness Ra (nm) | Young's modulus (relative value) | Linear adsorption ($\mu m^{-1}$) | Surface resistivity ($\Omega$/sq) |
| Example 78 | 6.0 | 127 | 1.86 | $3.6 \times 10^8$ |
| Example 79 | 6.3 | 125 | 2.43 | $2.6 \times 10^8$ |
| Example 80 | 6.0 | 127 | 1.68 | $2.3 \times 10^9$ |
| Example 81 | 6.4 | 125 | 1.73 | $8.8 \times 10^8$ |
| Example 82 | 6.4 | 129 | 2.26 | $6.4 \times 10^8$ |
| Example 83 | 6.8 | 127 | 2.66 | $1.6 \times 10^8$ |
| Example 84 | 7.0 | 127 | 2.22 | $7.1 \times 10^8$ |
| Example 85 | 6.6 | 130 | 2.23 | $8.8 \times 10^8$ |
| Example 86 | 6.6 | 127 | 2.05 | $2.3 \times 10^9$ |
| Example 87 | 6.2 | 135 | 2.38 | $5.6 \times 10^8$ |
| Example 88 | 6.4 | 126 | 2.41 | $1.3 \times 10^8$ |
| Comparative Example 42 | 8.1 | 126 | 1.19 | $7.3 \times 10^{10}$ |
| Comparative Example 43 | 9.6 | 121 | 1.26 | $6.8 \times 10^{11}$ |
| Comparative Example 44 | 13.8 | 118 | 1.38 | $8.8 \times 10^{10}$ |

TABLE 23

Production of non-magnetic acicular black iron-based composite particles

| Production Examples and Production Comparative Examples | Kind of core particles | Addition of fluoroalkylsilane | | | | | Addition of carbon black fine particles | | | | |
|---|---|---|---|---|---|---|---|---|---|---|---|
| | | Additives | | Edge runner | | Amount coated (calculated as Si) (wt. %) | Carbon black fine particles | | Edge runner | | Amount adhered (calculated as C) (wt. %) |
| | | Kind | Amount added (part by weight) | Linear load (Kg/cm) | Time (min) | | Kind | Amount added (part by weight) | Linear load (Kg/cm) | Time (min) | |
| Production Example 45 | Core particles 1 | TSL8527 | 1.0 | 30 | 30 | 0.07 | A | 9.0 | 40 | 40 | 8.26 |
| Production Example 46 | Core particles 2 | TSL8233 | 2.0 | 60 | 20 | 0.11 | A | 6.0 | 65 | 60 | 5.66 |
| Production Example 47 | Core particles 3 | TSL8262 | 3.0 | 40 | 40 | 0.47 | B | 5.0 | 30 | 30 | 4.76 |
| Production Example 48 | Core particles 4 | TSL8527 | 4.0 | 55 | 20 | 0.26 | B | 15.0 | 50 | 50 | 13.04 |
| Production Example 49 | Core particles 5 | TSL8233 | 5.0 | 40 | 60 | 0.26 | C | 15.0 | 55 | 35 | 13.04 |
| Production Example 50 | Core particles 6 | TSL8527 | 2.0 | 50 | 30 | 0.13 | A | 10.0 | 40 | 20 | 9.10 |
| Production Example 51 | Core particles 7 | TSL8233 | 1.5 | 30 | 40 | 0.08 | A | 15.0 | 60 | 30 | 13.07 |
| Production Example 52 | Core particles 8 | TSL8262 | 2.5 | 35 | 40 | 0.39 | B | 10.0 | 45 | 60 | 9.11 |
| Production Example 53 | Core particles 9 | TSL8527 | 5.5 | 60 | 30 | 0.36 | B | 8.0 | 60 | 30 | 7.41 |
| Production Example 54 | Core particles 10 | TSL8233 | 1.0 | 40 | 20 | 0.06 | C | 3.0 | 35 | 25 | 2.92 |
| Production Comparative Example 15 | Core particles 1 | TSL8527 | 2.0 | 60 | 30 | 0.13 | — | — | — | — | — |
| Production Comparative Example 16 | Core particles 4 | TSL8527 | 3.0 | 60 | 30 | 0.20 | A | 0.01 | 60 | 30 | 0.01 |
| Production Comparative Example 17 | Core particles 4 | TSL8527 | 0.005 | 60 | 30 | $3.3 \times 10^{-4}$ | B | 5.0 | 60 | 30 | 4.77 |

TABLE 24

| Production Examples and Production Comparative Examples | Properties of non-magnetic acicular black iron-based composite particles | | | | | | | | | |
|---|---|---|---|---|---|---|---|---|---|---|
| | Average major axis diameter (μm) | Average minor axis diameter (μm) | Aspect ratio (–) | Geometrical standard deviation (–) | BET specific surface area (m²/g) | Mn content (wt. %) | Volume resistivity (Ω·cm) | Blackness (L* value) (–) | Carbon black desorption percentage (%) | Thickness of carbon black coat (μm) |
| Production Example 45 | 0.144 | 0.0211 | 6.8:1 | 1.37 | 56.1 | — | $9.6 \times 10^3$ | 17.8 | 8.0 | 0.0024 |
| Production Example 46 | 0.187 | 0.0241 | 7.8:1 | 1.35 | 47.3 | — | $2.1 \times 10^4$ | 18.2 | 6.0 | 0.0022 |
| Production Example 47 | 0.158 | 0.0212 | 7.5:1 | 1.43 | 55.8 | 8.0 | $3.8 \times 10^4$ | 18.5 | 7.3 | 0.0022 |
| Production Example 48 | 0.241 | 0.0273 | 8.8:1 | 1.35 | 88.9 | — | $4.6 \times 10^3$ | 17.1 | 8.6 | 0.0024 |
| Production Example 49 | 0.190 | 0.0221 | 8.6:1 | 1.42 | 116.3 | 6.7 | $4.1 \times 10^3$ | 16.9 | 9.3 | 0.0025 |
| Production Example 50 | 0.143 | 0.0212 | 6.7:1 | 1.37 | 56.6 | — | $1.6 \times 10^4$ | 17.3 | 4.8 | 0.0024 |
| Production Example 51 | 0.187 | 0.0243 | 7.7:1 | 1.34 | 50.3 | — | $2.1 \times 10^3$ | 16.7 | 4.3 | 0.0025 |
| Production Example 52 | 0.158 | 0.0211 | 7.5:1 | 1.43 | 54.6 | 7.9 | $9.6 \times 10^3$ | 17.4 | 3.2 | 0.0023 |
| Production Example 53 | 0.241 | 0.0273 | 8.8:1 | 1.36 | 88.8 | — | $1.9 \times 10^4$ | 17.9 | 4.6 | 0.0023 |
| Production Example 54 | 0.190 | 0.0221 | 8.6:1 | 1.42 | 115.6 | 7.0 | $8.9 \times 10^4$ | 18.6 | 1.8 | 0.0021 |

TABLE 24-continued

| Production Examples and Production Comparative Examples | Properties of non-magnetic acicular black iron-based composite particles | | | | | | | | | |
|---|---|---|---|---|---|---|---|---|---|---|
| | Average major axis diameter (μm) | Average minor axis diameter (μm) | Aspect ratio (-) | Geometrical standard deviation (-) | BET specific surface area (m²/g) | Mn content (wt. %) | Volume resistivity (Ω·cm) | Blackness (L* value) (-) | Carbon black desorption percentage (%) | Thickness of carbon black coat (μm) |
| Production Comparative Example 15 | 0.143 | 0.0210 | 6.8:1 | 1.38 | 56.3 | — | $5.8 \times 10^7$ | 28.5 | — | |
| Production Comparative Example 16 | 0.240 | 0.0273 | 8.8:1 | 1.37 | 89.3 | — | $9.1 \times 10^7$ | 33.2 | — | |
| Production Comparative Example 17 | 0.240 | 0.0273 | 8.8:1 | 1.37 | 90.9 | — | $8.6 \times 10^6$ | 29.7 | 47.6 | |

TABLE 25

| Examples and Comparative Examples | Production of non-magnetic coating composition | | Properties of coating composition Viscosity (cP) | Properties of non-magnetic undercoat layer | | | | | |
|---|---|---|---|---|---|---|---|---|---|
| | Kind of non-magnetic particles | Weight ratio of particles to resin (-) | | Thickness (μm) | Gloss (%) | Surface roughness Ra (nm) | Young's modulus (relative value) | Linear absorption (μm⁻¹) | Surface resistivity (Ω/sq) |
| Example 89 | Production Example 44 | 5.0 | 333 | 3.5 | 195 | 6.4 | 127 | 1.84 | $2.3 \times 10^9$ |
| Example 90 | Production Example 45 | 5.0 | 384 | 3.4 | 191 | 6.6 | 123 | 2.31 | $2.3 \times 10^9$ |
| Example 91 | Production Example 46 | 5.0 | 333 | 3.5 | 192 | 6.4 | 124 | 1.70 | $5.1 \times 10^9$ |
| Example 92 | Production Example 47 | 5.0 | 410 | 3.5 | 190 | 6.8 | 125 | 1.63 | $6.7 \times 10^9$ |
| Example 93 | Production Example 48 | 5.0 | 640 | 3.5 | 190 | 7.0 | 129 | 2.64 | $3.6 \times 10^8$ |
| Example 94 | Production Example 49 | 5.0 | 568 | 3.5 | 195 | 6.4 | 123 | 2.66 | $3.1 \times 10^8$ |
| Example 95 | Production Example 50 | 5.0 | 333 | 3.4 | 198 | 6.2 | 123 | 2.18 | $3.8 \times 10^9$ |
| Example 96 | Production Example 51 | 5.0 | 358 | 3.5 | 199 | 6.2 | 126 | 2.68 | $5.0 \times 10^8$ |
| Example 97 | Production Example 52 | 5.0 | 435 | 3.5 | 196 | 6.4 | 123 | 2.20 | $5.6 \times 10^9$ |
| Example 98 | Production Example 53 | 5.0 | 307 | 3.4 | 206 | 6.0 | 130 | 2.01 | $1.8 \times 10^9$ |
| Example 99 | Production Example 54 | 5.0 | 256 | 3.3 | 213 | 5.8 | 125 | 1.53 | $9.6 \times 10^9$ |
| Comparative Example 45 | Production Comparative Example 15 | 5.0 | 568 | 3.5 | 178 | 11.0 | 120 | 0.90 | $7.1 \times 10^{13}$ |
| Comparative Example 46 | Production Comparative Example 16 | 5.0 | 1,280 | 3.6 | 173 | 13.2 | 115 | 0.94 | $9.4 \times 10^{12}$ |
| Comparative Example 47 | Production Comparative Example 17 | 5.0 | 3,072 | 3.7 | 156 | 20.8 | 110 | 1.18 | $2.3 \times 10^{11}$ |

TABLE 26

Properties of magnetic recording medium

| Examples and Comparative Examples | Kind of non-magnetic undercoat layer | Kind of magnetic particles | Weight ratio of particles to resin (-) | Thickness of magnetic coating film (μm) | Coercive force Hc (Oe) | Br/Brn (-) | Gloss (%) | Surface roughness Ra (nm) | Young's modulus (relative value) | Linear absorption (μm$^{-1}$) | Surface resistivity (Ω/sq) |
|---|---|---|---|---|---|---|---|---|---|---|---|
| Example 100 | Example 89 | Particles used in Example 2 | 5.0 | 1.0 | 1,973 | 0.88 | 228 | 6.2 | 126 | 1.88 | 6.1 × 10$^8$ |
| Example 101 | Example 90 | Particles used in Example 2 | 5.0 | 1.1 | 1,968 | 0.87 | 220 | 6.5 | 124 | 2.14 | 3.6 × 10$^8$ |
| Example 102 | Example 91 | Magnetic particles (1) | 5.0 | 1.0 | 1,981 | 0.87 | 225 | 6.6 | 127 | 1.86 | 8.9 × 10$^8$ |
| Example 103 | Example 92 | Magnetic particles (1) | 5.0 | 1.0 | 1,974 | 0.87 | 213 | 7.4 | 123 | 1.64 | 1.8 × 10$^9$ |
| Example 104 | Example 93 | Magnetic particles (2) | 5.0 | 1.0 | 1,773 | 0.88 | 210 | 7.0 | 129 | 2.68 | 3.1 × 10$^8$ |
| Example 105 | Example 94 | Magnetic particles (2) | 5.0 | 1.1 | 1,778 | 0.87 | 205 | 7.6 | 125 | 2.65 | 1.6 × 10$^8$ |
| Example 106 | Example 95 | Particles used in Example 2 | 5.0 | 1.0 | 1,978 | 0.88 | 228 | 6.2 | 125 | 2.22 | 3.2 × 10$^9$ |
| Example 107 | Example 96 | Magnetic particles (1) | 5.0 | 1.1 | 1,993 | 0.87 | 221 | 6.4 | 130 | 2.63 | 2.2 × 10$^8$ |
| Example 108 | Example 97 | Magnetic particles (2) | 5.0 | 1.0 | 1,784 | 0.89 | 215 | 6.6 | 125 | 2.18 | 4.6 × 10$^9$ |
| Example 109 | Example 98 | Magnetic particles (3) | 5.0 | 1.0 | 980 | 0.89 | 188 | 7.5 | 134 | 1.94 | 6.8 × 10$^9$ |
| Example 110 | Example 99 | Magnetic particles (4) | 5.0 | 1.0 | 915 | 0.89 | 186 | 7.0 | 125 | 1.52 | 8.9 × 10$^9$ |
| Comparative Example 48 | Comparative Example 45 | Magnetic particles (1) | 5.0 | 1.0 | 1,973 | 0.86 | 186 | 9.1 | 124 | 1.18 | 8.0 × 10$^{10}$ |
| Comparative Example 49 | Comparative Example 46 | Magnetic particles (1) | 5.0 | 1.1 | 1,968 | 0.85 | 183 | 11.6 | 119 | 1.24 | 3.1 × 10$^{11}$ |
| Comparative Example 50 | Comparative Example 47 | Magnetic particles (1) | 5.0 | 1.1 | 1,965 | 0.84 | 153 | 16.8 | 114 | 1.32 | 3.2 × 10$^{10}$ |

What is claimed is:

1. A magnetic recording medium comprising:
a non-magnetic base film;
a non-magnetic undercoat layer formed on said non-magnetic base film, comprising a binder resin and non-magnetic acicular black iron-based composite particles; and
a magnetic coating film comprising a binder resin and magnetic particles,
said non-magnetic acicular black iron-based composite particles comprising:
acicular hematite particles or acicular iron oxide hydroxide particles having an average major axis diameter of 0.02 to 0.30 μm;
a coating layer formed on the surface of said acicular hematite particle or acicular iron oxide hydroxide particle, comprising at least one organosilicon compound selected from the group consisting of:
(1) organosilane compounds obtained from an alkoxysilane compound,
(2) polysiloxanes or modified polysiloxanes, and
(3) fluoroalkyl organosilane compounds obtained from a fluoroalkylsilane compound; and
a carbon black coat formed on said coating layer comprising said organosilicon compound, in an amount of 1 to 20 parts by weight based on 100 parts by weight of said acicular hematite particles or acicular iron oxide hydroxide particles.

2. A magnetic recording medium according to claim 1, wherein said acicular hematite particles or acicular iron oxide hydroxide particles are particles having a coat formed on at least a part of the surface of said acicular hematite particles or acicular iron oxide hydroxide particles and comprising at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the acicular hematite particles or acicular iron oxide hydroxide particles.

3. A magnetic recording medium according to claim 2, which further comprises a gloss of coating film of 124 to 300%, a surface roughness Ra of coating film of not more than 12.0 nm, a linear absorption of coating film of 1.10 to 2.00 $\mu m^{-1}$, and a surface resistivity of not more than $5\times10^8$ Ω/sq.

4. A magnetic recording medium according to claim 1, wherein said modified polysiloxanes are ones selected from the group consisting of:
   (A) polysiloxanes modified with at least one compound selected from the group consisting of polyethers, polyesters and epoxy compounds, and
   (B) polysiloxanes whose molecular terminal is modified with at least one group selected from the group consisting of carboxylic acid groups, alcohol groups and a hydroxyl group.

5. A magnetic recording medium according to claim 4, wherein said polysiloxanes modified with at least one compound selected from the group consisting of polyethers, polyesters and epoxy compounds are represented by the general formula (III), (IV) or (V):

(III)

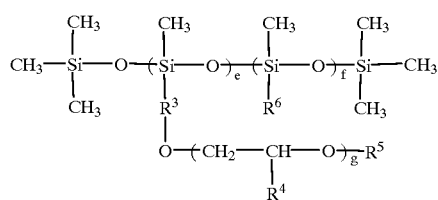

wherein $R^3$ is —($-CH_2-$)$_h$—; $R^4$ is —($-CH_2-$)$_i$—$CH_3$; $R^5$ is —OH, —COOH, —CH=$CH_2$, —C($CH_3$)=$CH_2$ or —($-CH_2-$)$_j$—$CH_3$; $R^6$ is —($-CH_2-$)$_k$—$CH_3$; g and h are an integer of 1 to 15; i, j and k are an integer of 0 to 15; e is an integer of 1 to 50; and f is an integer of 1 to 300;

(IV)

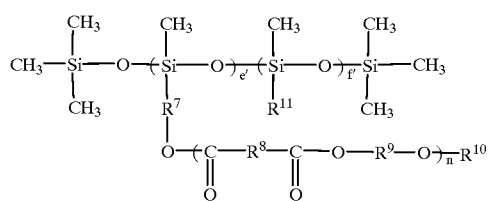

wherein $R^7$, $R^8$ and $R^9$ are —($-CH_2-$)$_q$— and may be the same or different; $R^{10}$ is —OH, —COOH, —CH=$CH_2$, —C($CH_3$)=$CH_2$ or —($-CH_2-$)$_r$—$CH_3$; $R^{11}$ is —($-CH_2-$)$_s$—$CH_3$; n and q are an integer of 1 to 15; r and s are an integer of 0 to 15; e' is an integer of 1 to 50; and f' is an integer of 1 to 300; or (V)

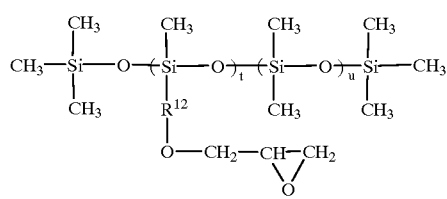

wherein $R^{12}$ is —($-CH_2-$)$_v$—; v is an integer of 1 to 15; t is an integer of 1 to 50; and u is an integer of 1 to 300.

6. A magnetic recording medium according to claim 4, wherein said polysiloxanes whose molecular terminal is modified with at least one group selected from the group consisting of carboxylic acid groups, alcohol groups and a hydroxyl group are represented by the general formula (VI):

(VI)

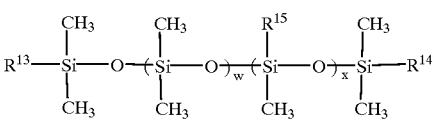

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —($-CH_2-$)$_y$—; y is an integer of 1 to 15; w is an integer of 1 to 200; and x is an integer of 0 to 100.

7. A magnetic recording medium according to claim 1, wherein said alkoxysilane compound is represented by the general formula (I):

$$R^1{}_a SiX_{4-a} \qquad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

8. A magnetic recording medium according to claim 7, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

9. A magnetic recording medium according to claim 1, wherein said polysiloxanes are represented by the general formula (II):

(II)

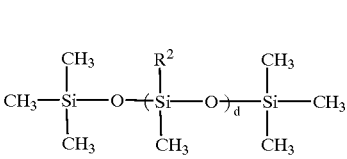

wherein $R^2$ is H— or particle, particle-, and d is an integer of 15 to 450.

10. A magnetic recording medium according to claim 9, wherein said polysiloxanes are ones having methyl hydrogen siloxane units.

11. A magnetic recording medium according to claim 1, wherein said fluoroalkylsilane compounds are represented by the general formula (VII):

$$CF_3(CF_2)_z CH_2 CH_2 (R^{18})_{a'} SiX_{4-a'} \qquad (VII)$$

wherein $R^{18}$ is $CH_3$—, $C_2H_5$—, $CH_3O$— or $C_2H_5O$—; X is $CH_3O$— or $C_2H_5O$—; and z is an integer of 0 to 15; and a' is an integer of 0 to 3.

12. A magnetic recording medium according to claim 1, wherein said acicular hematite particles are acicular manganese-containing hematite particles.

13. A magnetic recording medium according to claim 1, wherein said acicular iron oxide hydroxide particles are acicular manganese-containing goethite particles.

14. A magnetic recording medium according to claim 1, wherein the amount of said coating organosilicon compounds is 0.02 to 5.0% by weight, calculated as Si, based on the total weight of the organosilicon compounds and said acicular hematite particles or acicular iron oxide hydroxide particles.

15. A magnetic recording medium according to claim 1, wherein said carbon black coat is obtained by mixing carbon black fine particles having a particle size of 0.002 to 0.05 μm with the acicular hematite particles or acicular iron oxide hydroxide particles coated with at least one organosilicon compound while applying a shear force.

16. A magnetic recording medium according to claim 1, wherein the thickness of said carbon black coat is not more than 0.04 μm.

17. A magnetic recording medium according to claim 1, which further comprises a gloss of coating film of 122 to 300%, a surface roughness Ra of coating film of not more than 12.0 nm, a linear absorption of coating film of 1.10 to 2.00 μm$^{-1}$, and a surface resistivity of not more than $5\times10^8$ Ω/sq.

18. A non-magnetic substrate comprising:
a non-magnetic base film; and
a non-magnetic undercoat layer formed on said non-magnetic base film, comprising a binder resin and non-magnetic acicular black iron-based composite particles,
said non-magnetic acicular black iron-based composite particles comprising:
acicular hematite particles or acicular iron oxide hydroxide particles having an average major axis diameter of 0.02 to 0.30 μm;
a coating layer formed on the surface of said acicular hematite particle or acicular iron oxide hydroxide particle, comprising at least one organosilicon compound selected from the group consisting of:
(1) organosilane compounds obtained from an alkoxysilane compound,
(2) polysiloxanes or modified polysiloxanes, and
(3) fluoroalkyl organosilane compounds obtained from a fluoroalkylsilane compound; and
a carbon black coat formed on said coating layer comprising said organosilicon compound coated, in an amount of 1 to 20 parts by weight based on 100 parts by weight of said acicular hematite particles or acicular iron oxide hydroxide particles.

19. A non-magnetic substrate according to claim 18, wherein said acicular hematite particles or acicular iron oxide hydroxide particles are particles having a coat formed on at least a part of the surface of said acicular hematite particles or acicular iron oxide hydroxide particles and comprising at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the acicular hematite particles or acicular iron oxide hydroxide particles.

20. A non-magnetic substrate according to claim 19, which further comprises a gloss of coating film of 187 to 300%, a surface roughness Ra of coating film of 0.5 to 9.5 nm, and a surface resistivity of not more than $5\times10^9$ Ω/sq.

21. A non-magnetic substrate according to claim 18, wherein said modified polysiloxanes are ones selected from the group consisting of:
(A) polysiloxanes modified with at least one compound selected from the group consisting of polyethers, polyesters and epoxy compounds, and
(B) polysiloxanes whose molecular terminal is modified with at least one group selected from the group consisting of carboxylic acid groups, alcohol groups and a hydroxyl group.

22. A non-magnetic substrate according to claim 21, wherein said polysiloxanes modified with at least one compound selected from the group consisting of polyethers, polyesters and epoxy compounds are represented by the general formula (III), (IV) or (V):

(III)

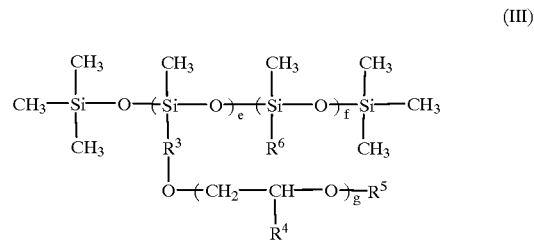

wherein R$^3$ is —(—CH$_2$—)$_h$—; R$^4$ is —(—CH$_2$—)$_i$—CH$_3$; R$^5$ is —OH, —COOH, —CH=CH$_2$, —C(CH$_3$)=CH$_2$ or —(—CH$_2$—)$_j$—CH$_3$; R$^6$ is —(—CH$_2$—)$_k$—CH$_3$; g and h are an integer of 1 to 15; i, j and k are an integer of 0 to 15; e is an integer of 1 to 50; and f is an integer of 1 to 300;

(IV)

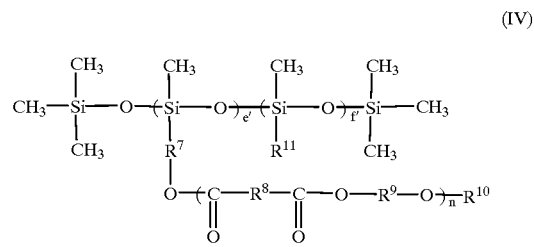

wherein R$^7$, R$^8$ and R$^9$ are —(—CH$_2$—)$_q$— and may be the same or different; R$^{10}$ is —OH, —COOH, —CH=CH$_2$, —C(CH$_3$)=CH$_2$ or —(—CH$_2$—)$_r$—CH$_3$; R$^{11}$ is —(—CH$_2$—)$_s$—CH$_3$; n and q are an integer of 1 to 15; r and s are an integer of 0 to 15; e' is an integer of 1 to 50; and f' is an integer of 1 to 300; or (V)

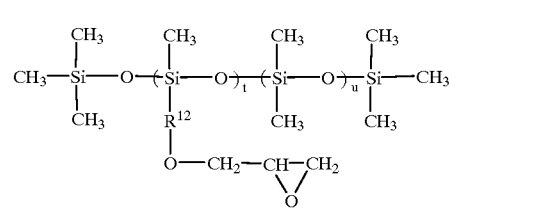

wherein R$^{12}$ is —(—CH$_2$—)$_v$—; v is an integer of 1 to 15; t is an integer of 1 to 50; and u is an integer of 1 to 300.

23. A non-magnetic substrate according to claim 21, wherein said polysiloxanes whose molecular terminal is modified with at least one group selected from the group consisting of carboxylic acid groups, alcohol groups and a hydroxyl group are represented by the general formula (VI):

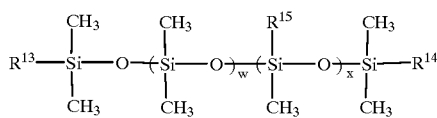 (VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; y is an integer of 1 to 15; w is an integer of 1 to 200; and x is an integer of 0 to 100.

24. A non-magnetic substrate according to claim 18, wherein said alkoxysilane compound is represented by the general formula (I):

 (I)

wherein $R^1$ is C$_6$H$_5$—, (CH$_3$)$_2$CHCH$_2$— or n-C$_b$H$_{2b+1}$— (wherein b is an integer of 1 to 18); X is CH$_3$O— or C$_2$H$_5$O—; and a is an integer of 0 to 3.

25. A non-magnetic substrate according to claim 24, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

26. A non-magnetic substrate according to claim 18, wherein said polysiloxanes are represented by the general formula (II):

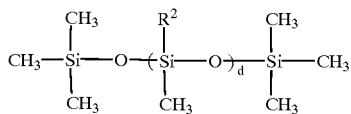 (II)

wherein $R^2$ is H— or CH$_3$—, and d is an integer of 15 to 450.

27. A non-magnetic substrate according to claim 26, wherein said polysiloxanes are ones having methyl hydrogen siloxane units.

28. A non-magnetic substrate according to claim 18, wherein said fluoroalkylsilane compounds are represented by the general formula (VII):

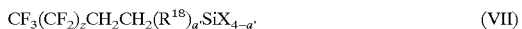 (VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

29. A non-magnetic substrate according to claim 18, wherein said acicular hematite particles are acicular manganese-containing hematite particles.

30. A non-magnetic substrate according to claim 18, wherein said acicular iron oxide hydroxide particles are acicular manganese-containing goethite particles.

31. A non-magnetic substrate according to claim 18, wherein the amount of said coating organosilicon compounds is 0.02 to 5.0% by weight, calculated as Si, based on the total weight of the organosilicon compounds and said acicular hematite particles or acicular iron oxide hydroxide particles.

32. A non-magnetic substrate according to claim 18, wherein said carbon black coat is obtained by mixing carbon black fine particles having a particle size of 0.002 to 0.05 μm with the acicular hematite particles or acicular iron oxide hydroxide particles coated with at least one organosilicon compound while applying a shear force.

33. A non-magnetic substrate according to claim 18, wherein the thickness of said carbon black coat is not more than 0.04 μm.

34. A non-magnetic substrate according to claim 18, which further comprises a gloss of coating film of 185 to 300%, a surface roughness Ra of coating film of 0.5 to 10.0 nm, and a surface resistivity of not more than 5×10$^9$ Ω/sq.

* * * * *